United States Patent [19]
Usui

[11] Patent Number: 5,995,296
[45] Date of Patent: Nov. 30, 1999

[54] ZOOM LENS

[75] Inventor: Fumiaki Usui, Utsunomiya, Japan

[73] Assignee: Canon Kabushiki Kaisha, Tokyo, Japan

[21] Appl. No.: 09/116,444

[22] Filed: Jul. 16, 1998

[30] Foreign Application Priority Data

Jul. 25, 1997 [JP] Japan ................................. 9-200124

[51] Int. Cl.$^6$ ................................................. G20B 15/14
[52] U.S. Cl. ..................... 359/684; 359/685; 359/686; 359/687; 359/688
[58] Field of Search .......................... 359/676, 683–688, 359/569–570

[56] References Cited

U.S. PATENT DOCUMENTS

| | | | |
|---|---|---|---|
| 4,948,234 | 8/1990 | Mihara | 350/423 |
| 5,579,172 | 11/1996 | Aoki et al. | 359/688 |
| 5,583,700 | 12/1996 | Usui et al. | 359/688 |
| 5,737,128 | 4/1998 | Usui | 359/686 |
| 5,745,300 | 4/1998 | Usui et al. | 359/684 |
| 5,751,497 | 5/1998 | Usui et al. | 359/687 |
| 5,831,771 | 11/1998 | Suzuki | 359/689 |

FOREIGN PATENT DOCUMENTS

| | | |
|---|---|---|
| 54-127322 | 10/1979 | Japan . |
| 6-250086 | 9/1994 | Japan . |
| 8-184758 | 7/1996 | Japan . |

OTHER PUBLICATIONS

Patent Abstracts of Japan, vol. 18, No. 642 (P–1838) (JP 6–250086, Sep. 9, 1994), Dec. 6, 1994.

*Primary Examiner*—Georgia Epps
*Assistant Examiner*—David N. Spector
*Attorney, Agent, or Firm*—Fitzpatrick, Cella, Harper & Scinto

[57] ABSTRACT

There is disclosed a zoom lens having, in order from an object side, a first lens unit having a positive refractive power, a second lens unit having a negative refractive power and adapted to move in the zooming operation, a third lens unit for correcting the variation in the image plane resulting from the movement of the second lens unit, and a fixed fourth lens unit having a positive refractive power, wherein an aspherical surface of a predetermined shape for satisfactorily correcting the spherical aberration and the distortion aberration resulting from the zooming operation is applied onto a predetermined lens in the lens unit.

6 Claims, 30 Drawing Sheets

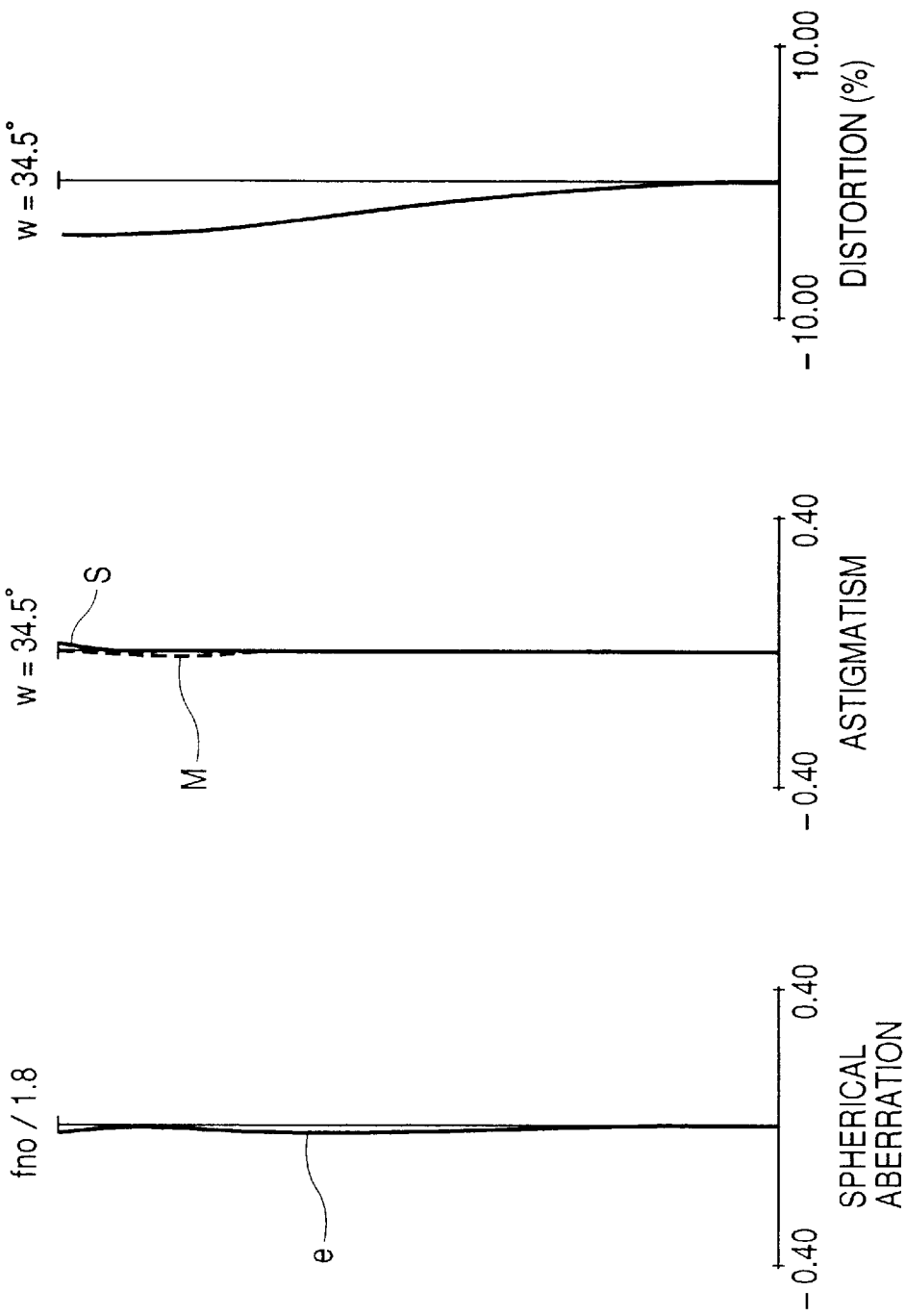

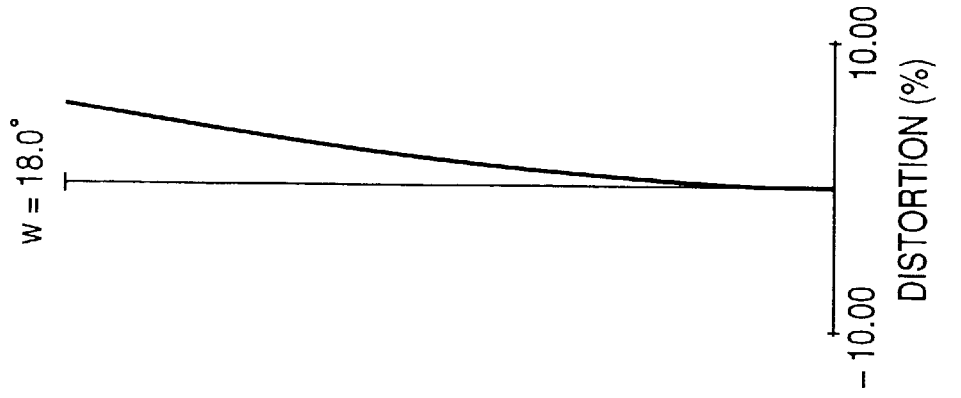
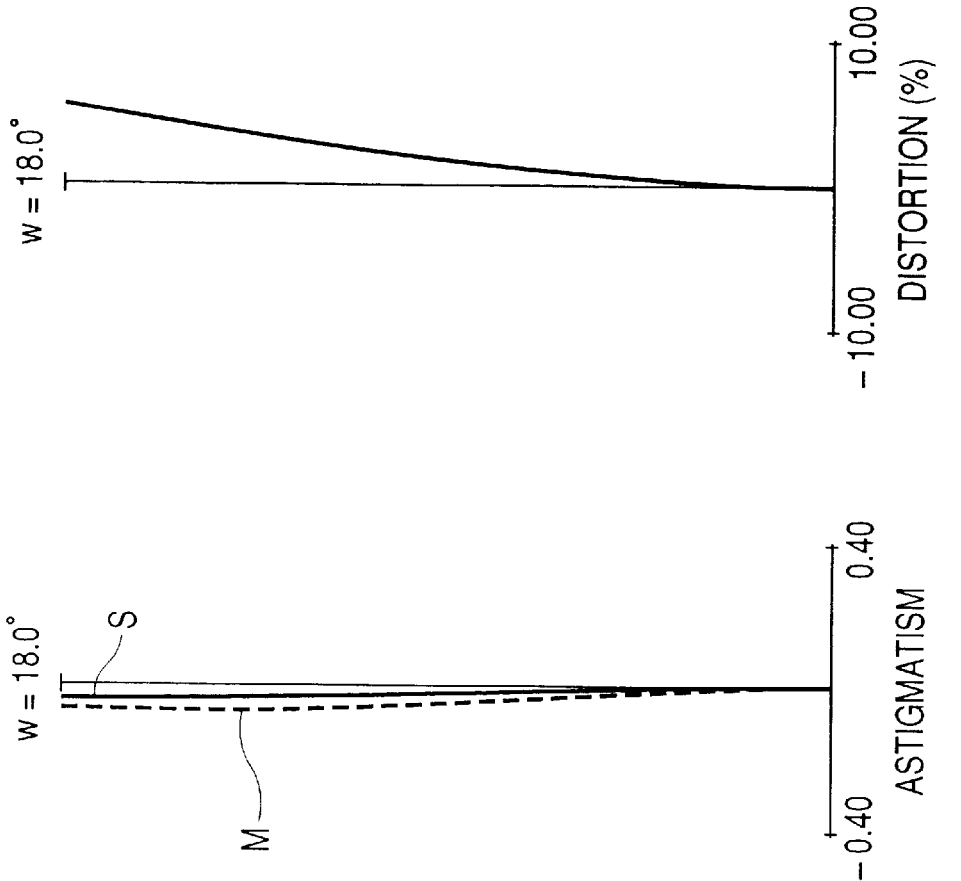
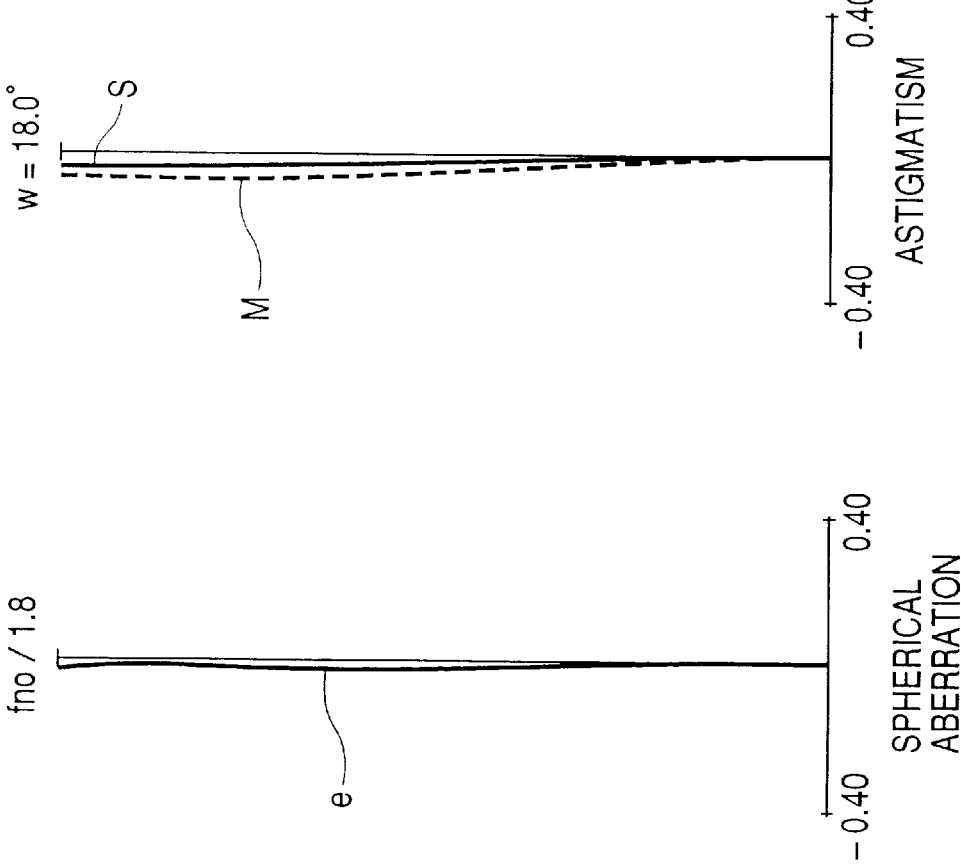

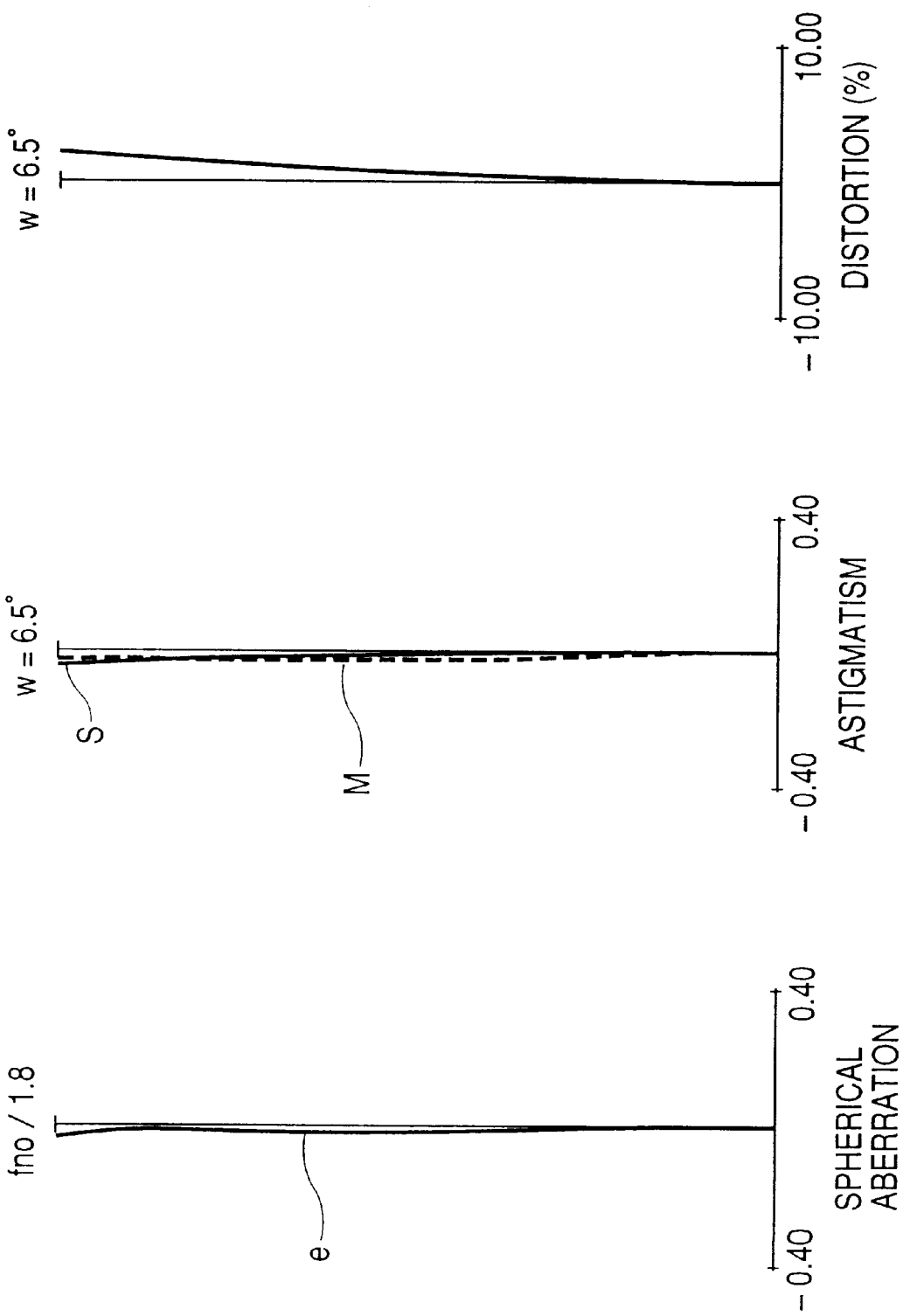

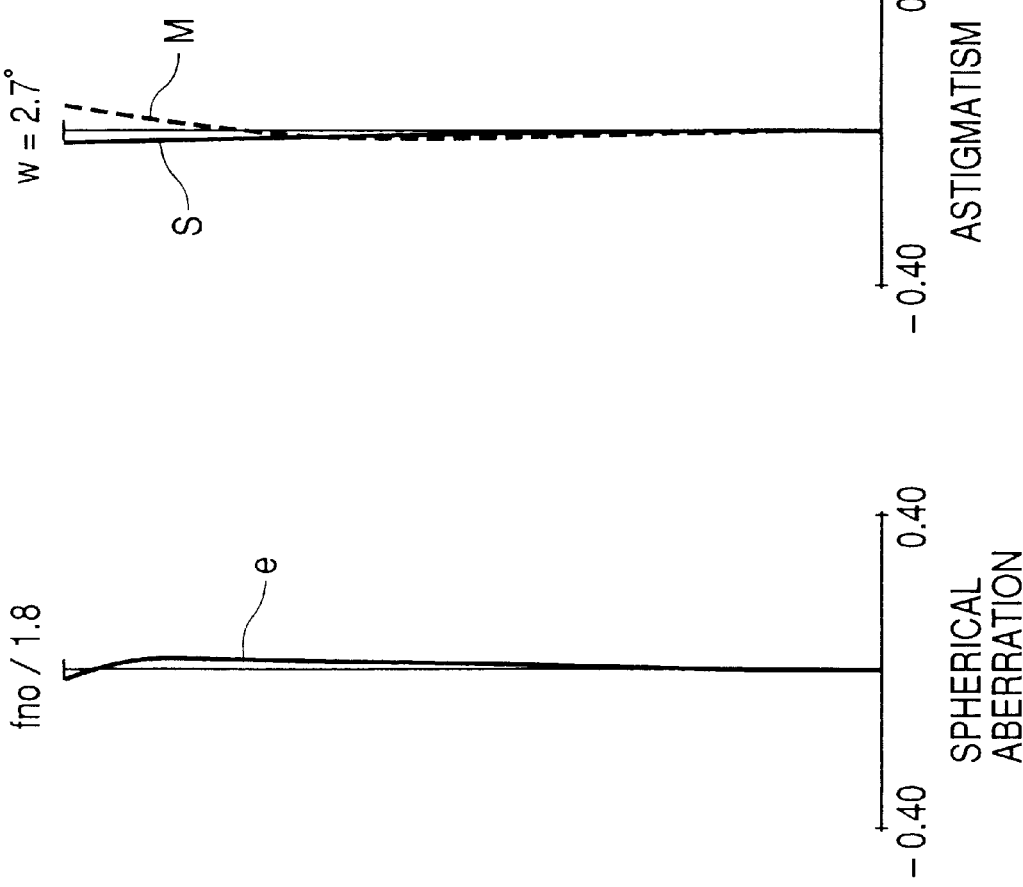
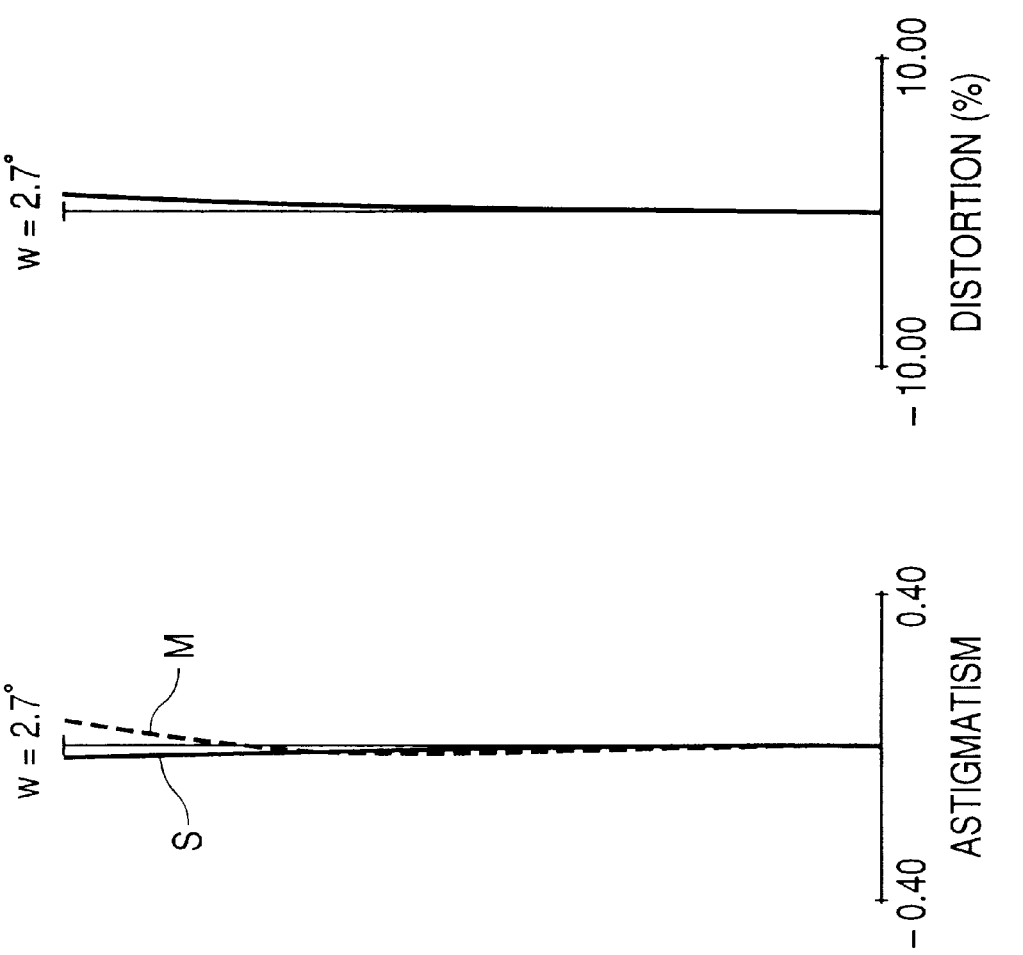
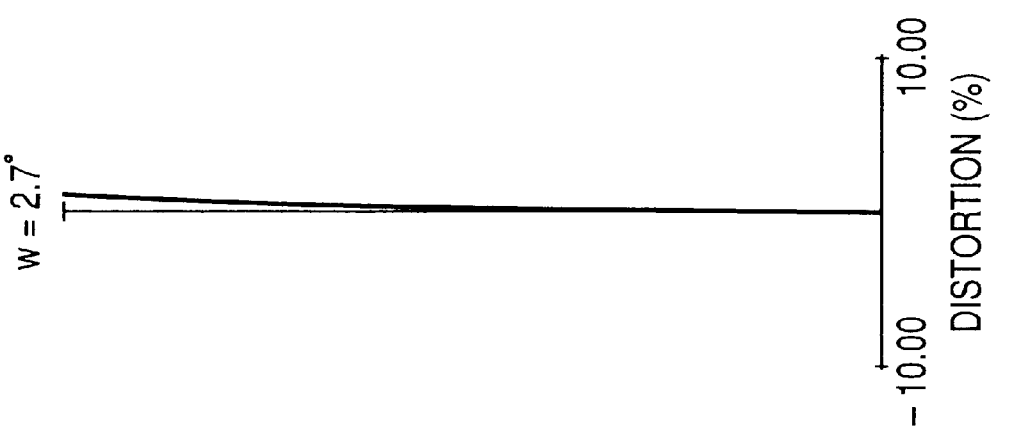

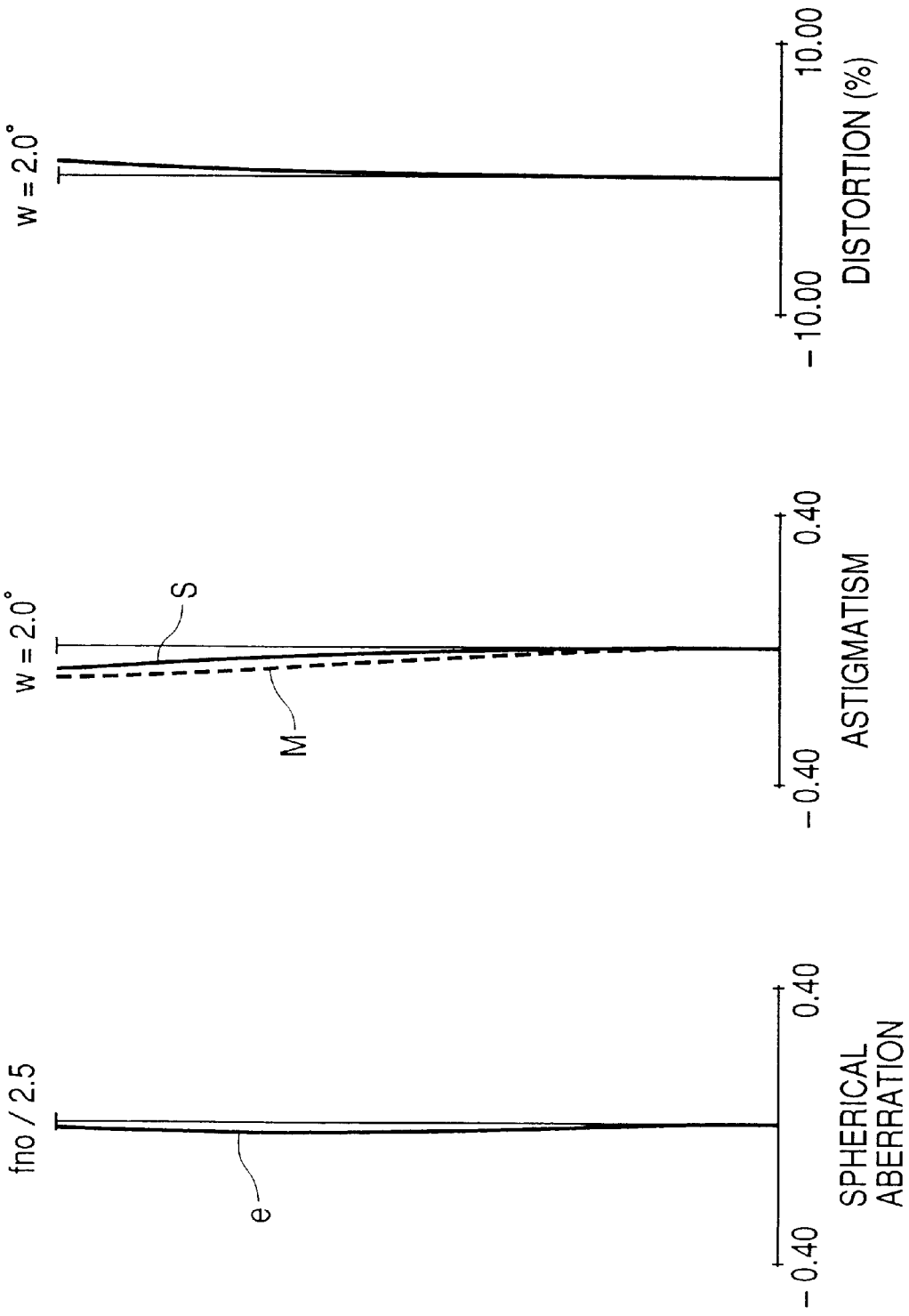

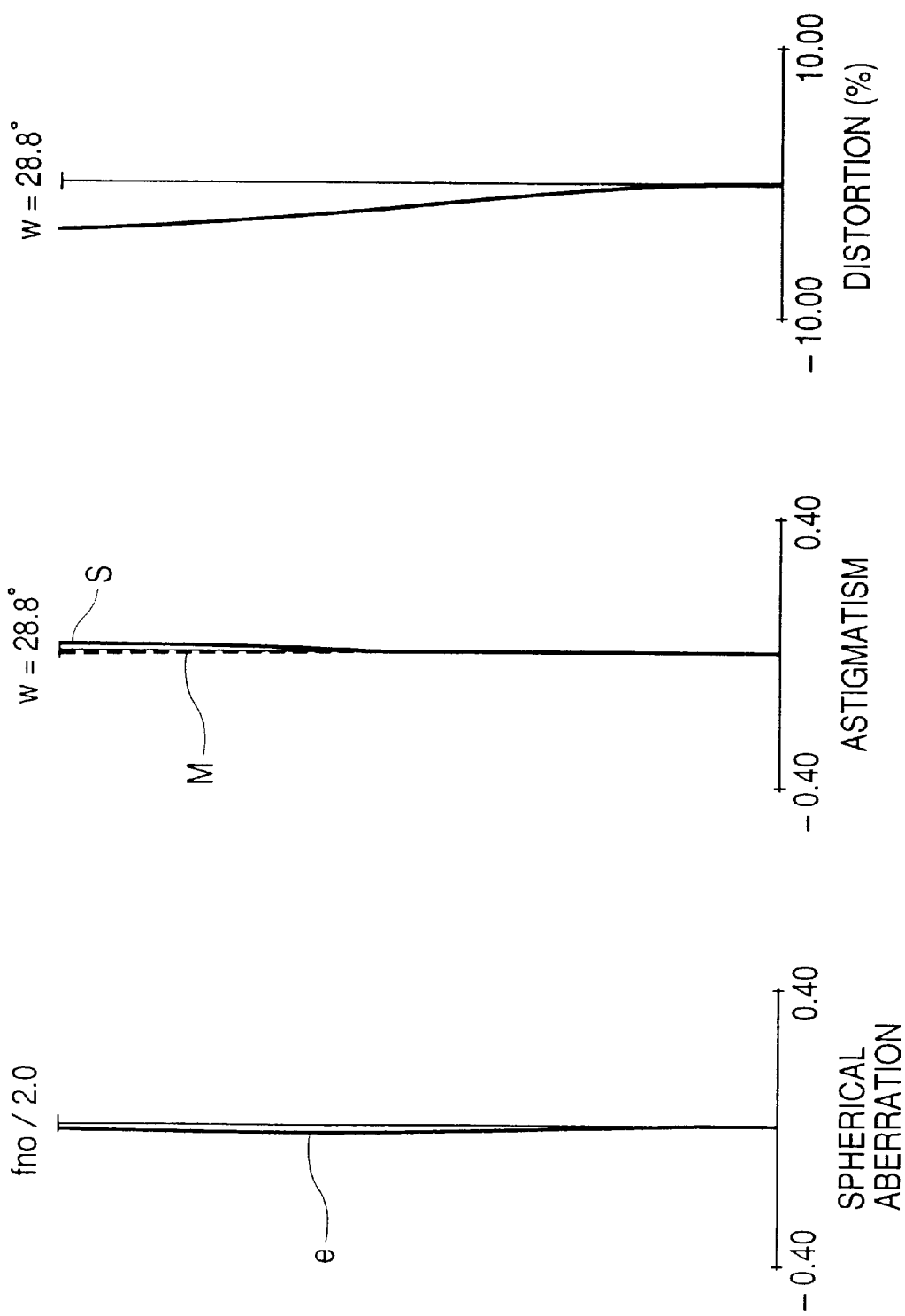

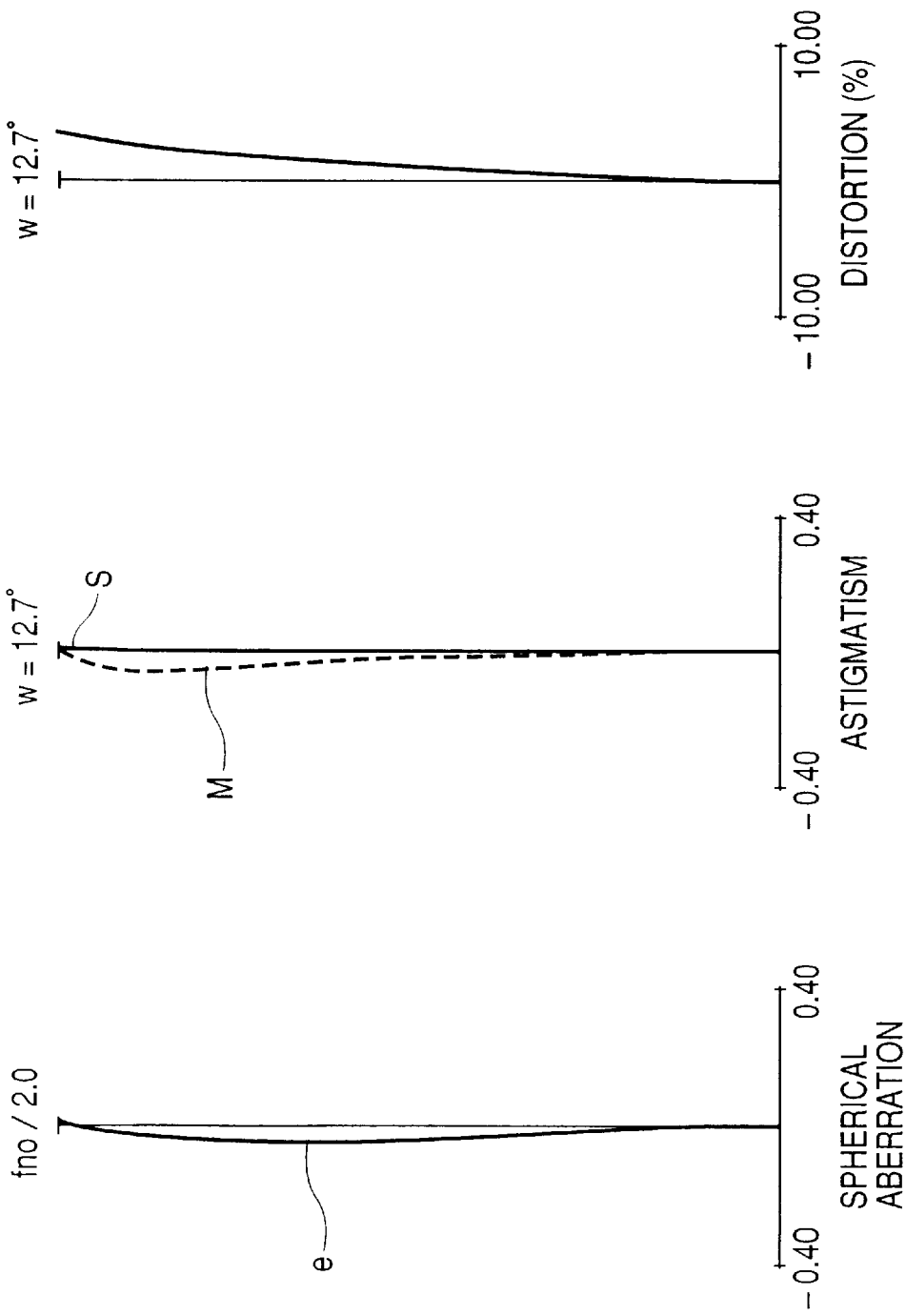

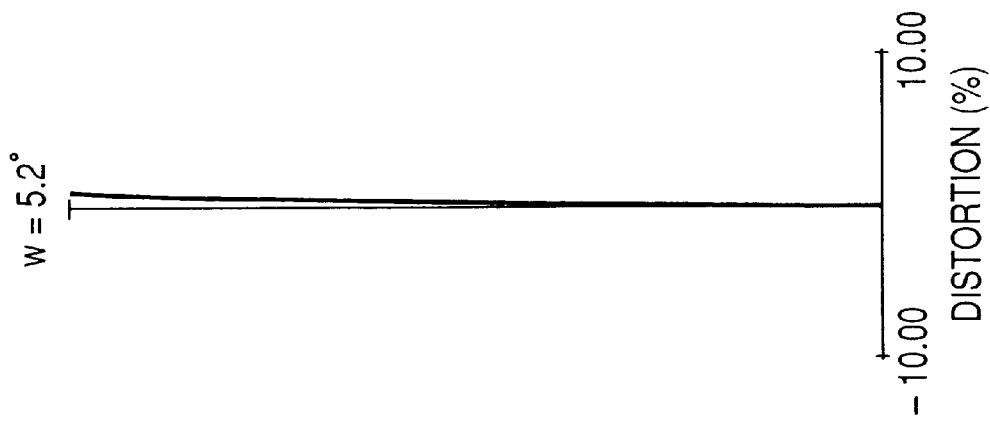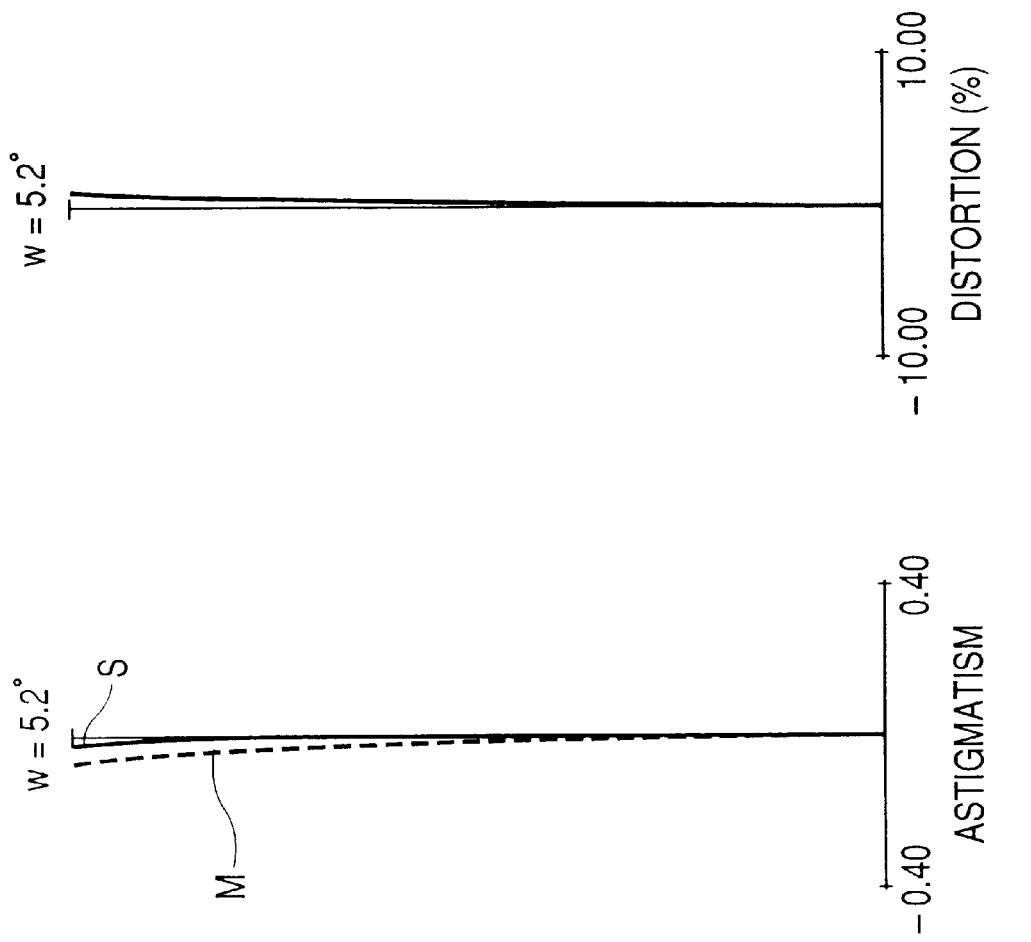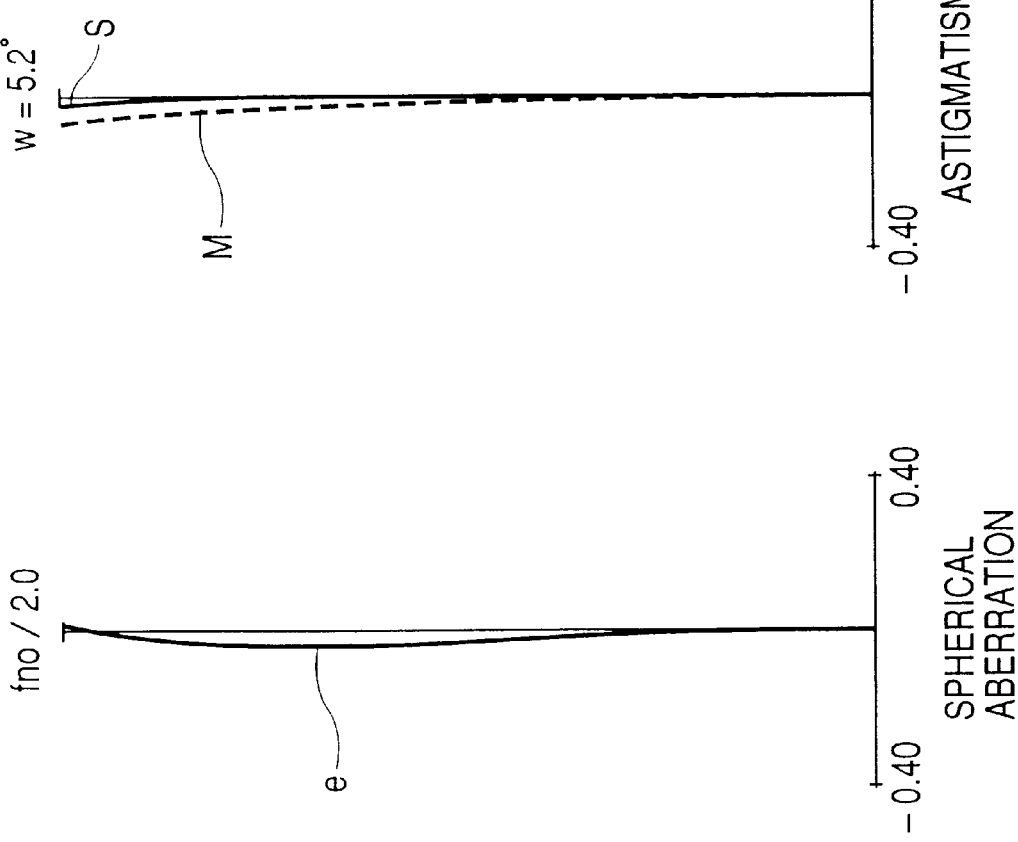

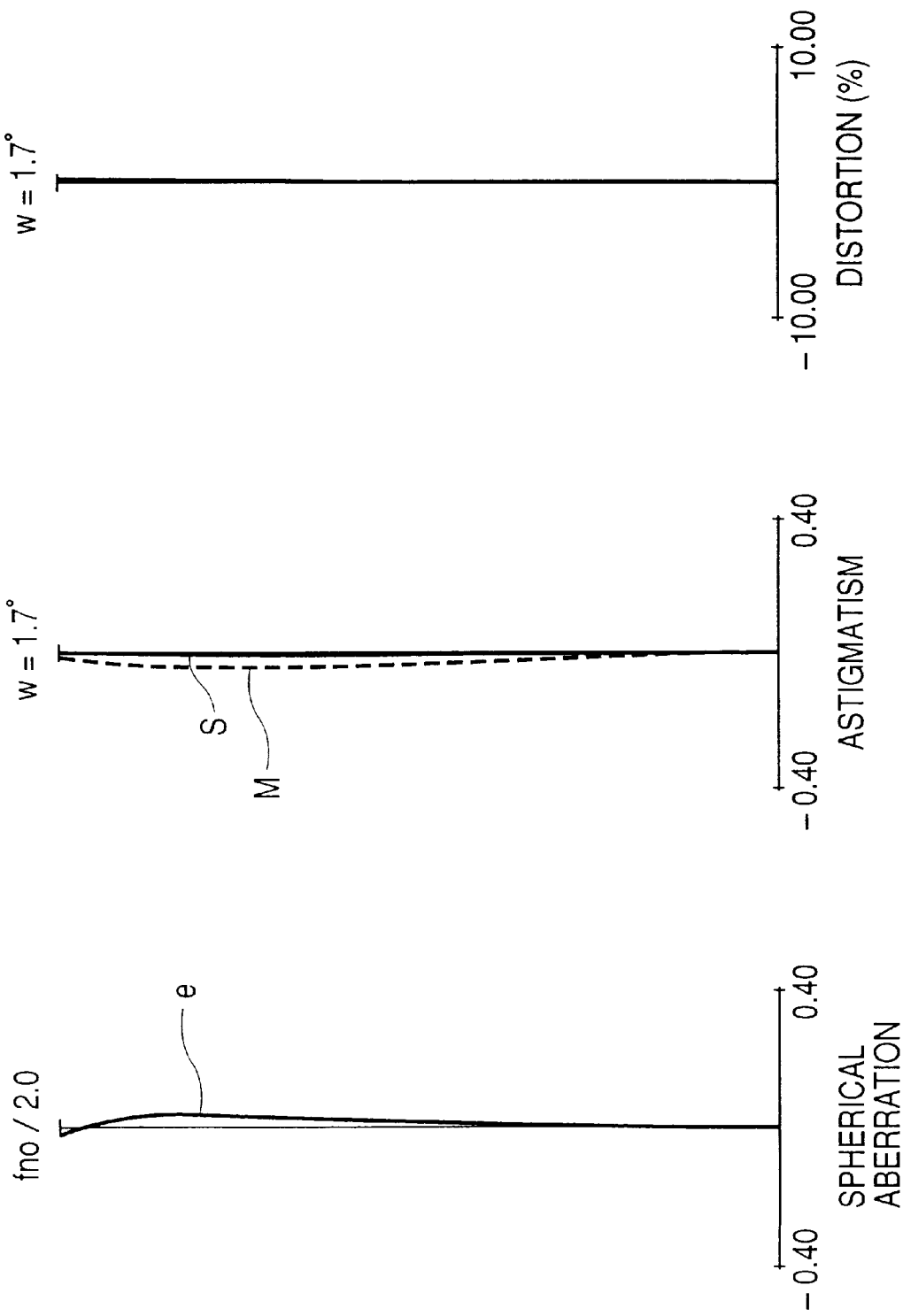

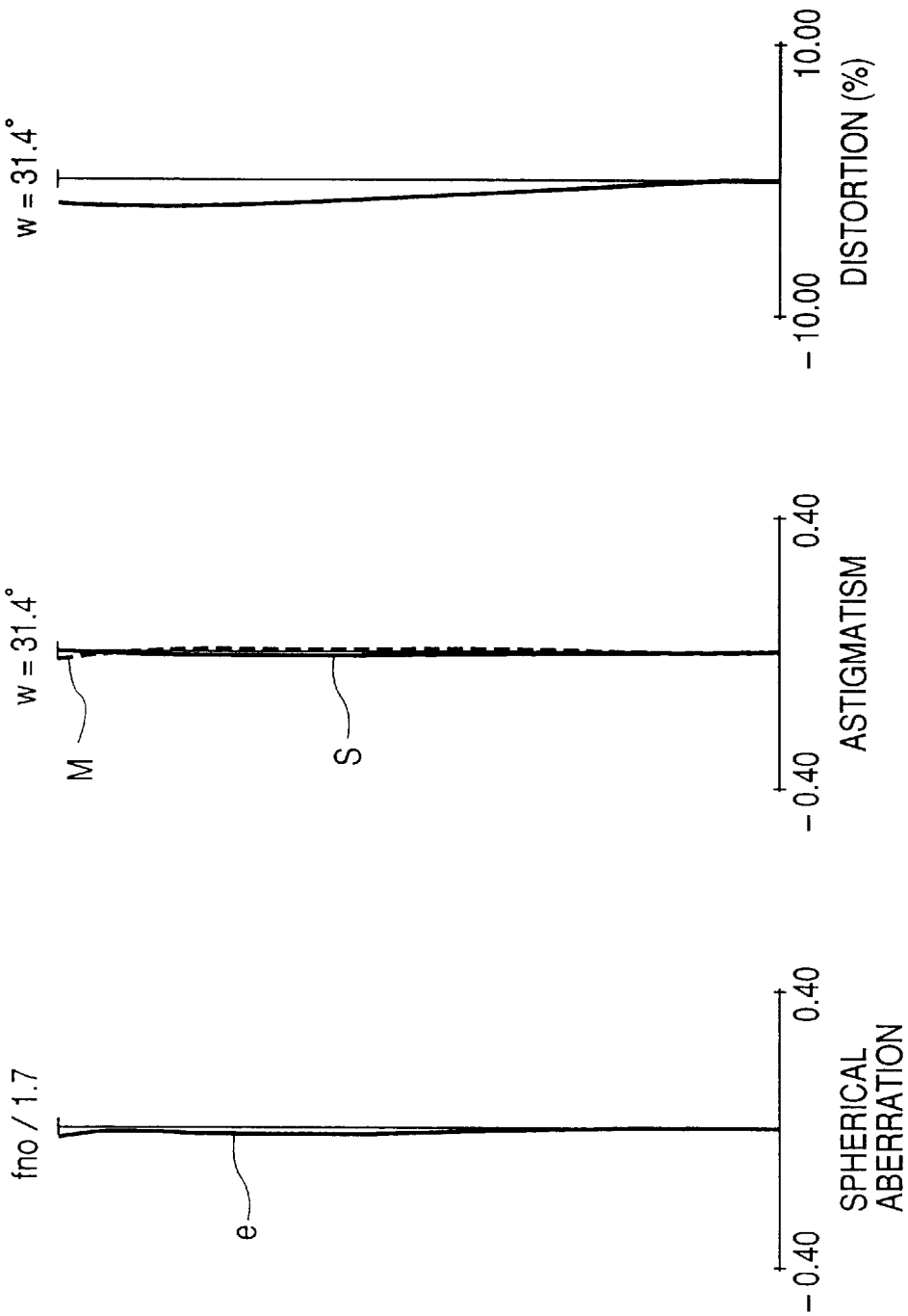

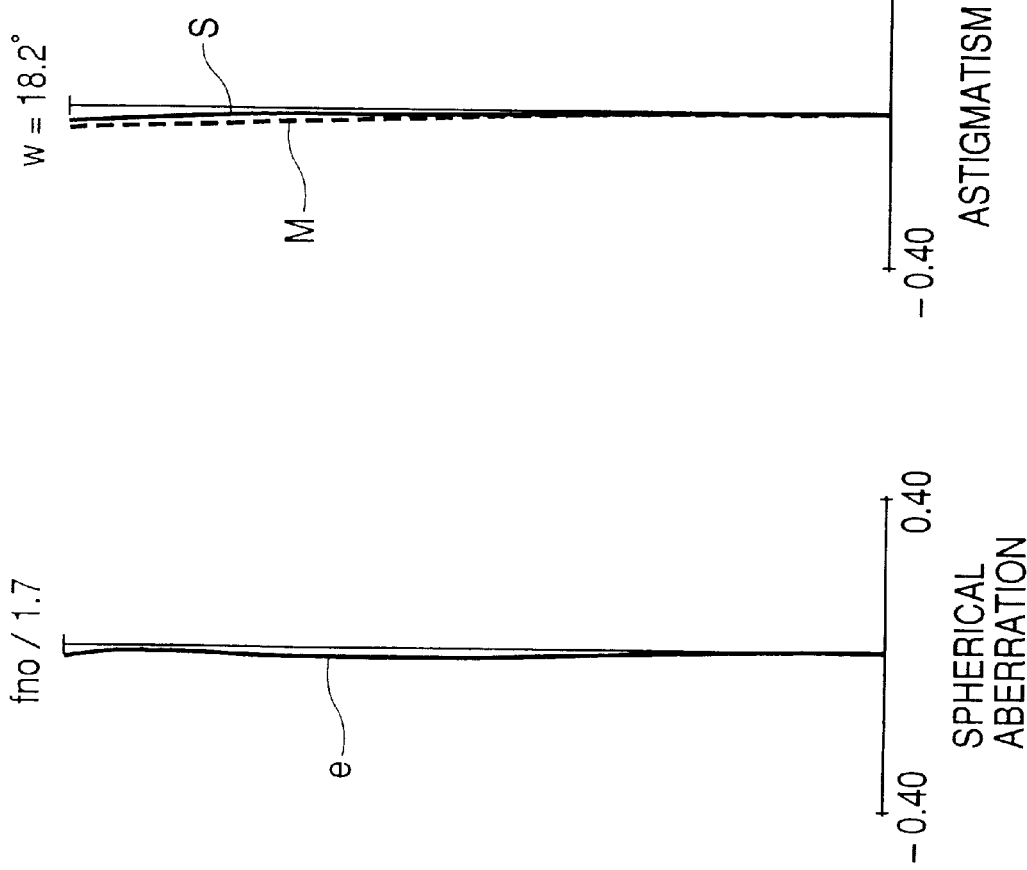
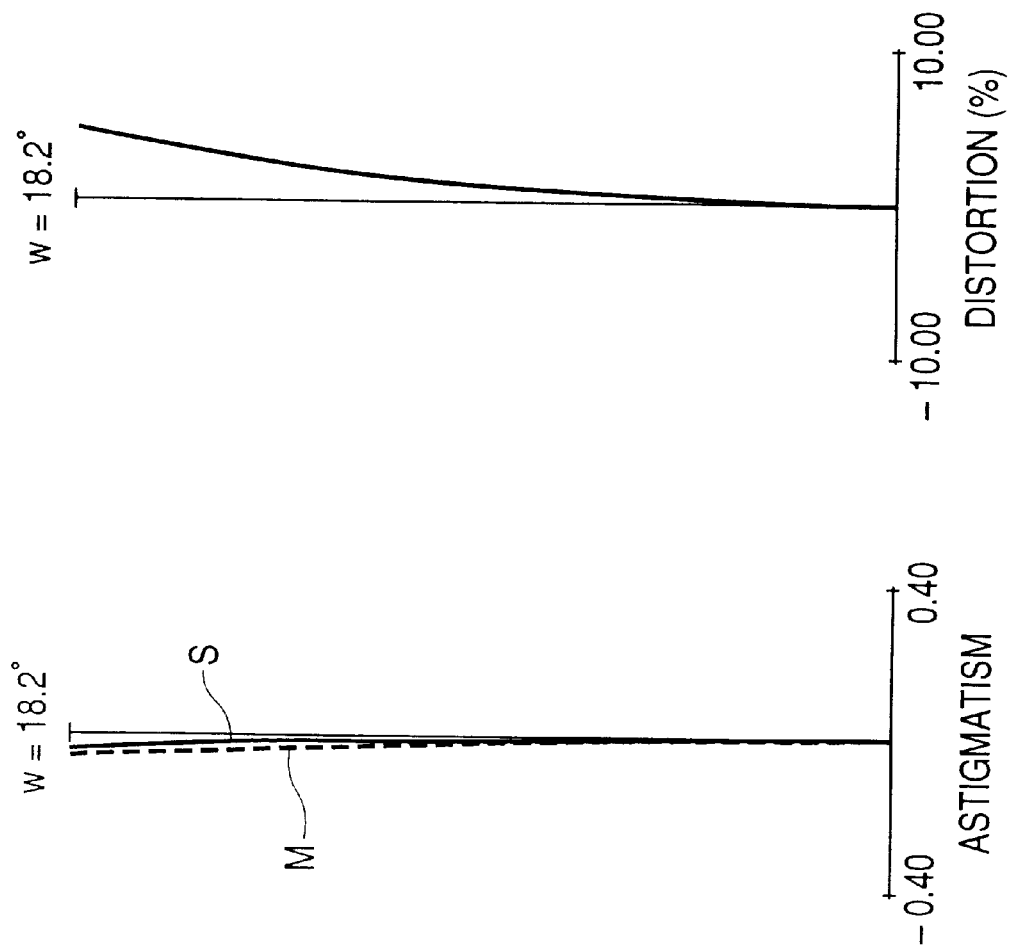
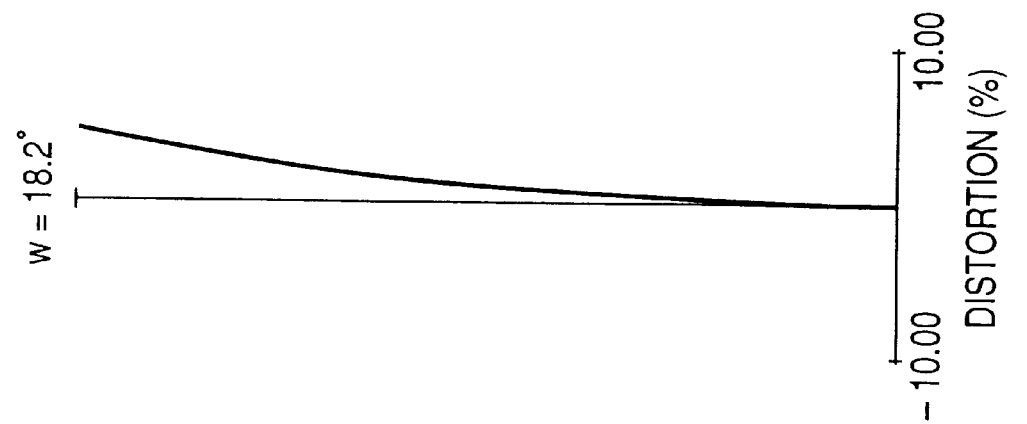

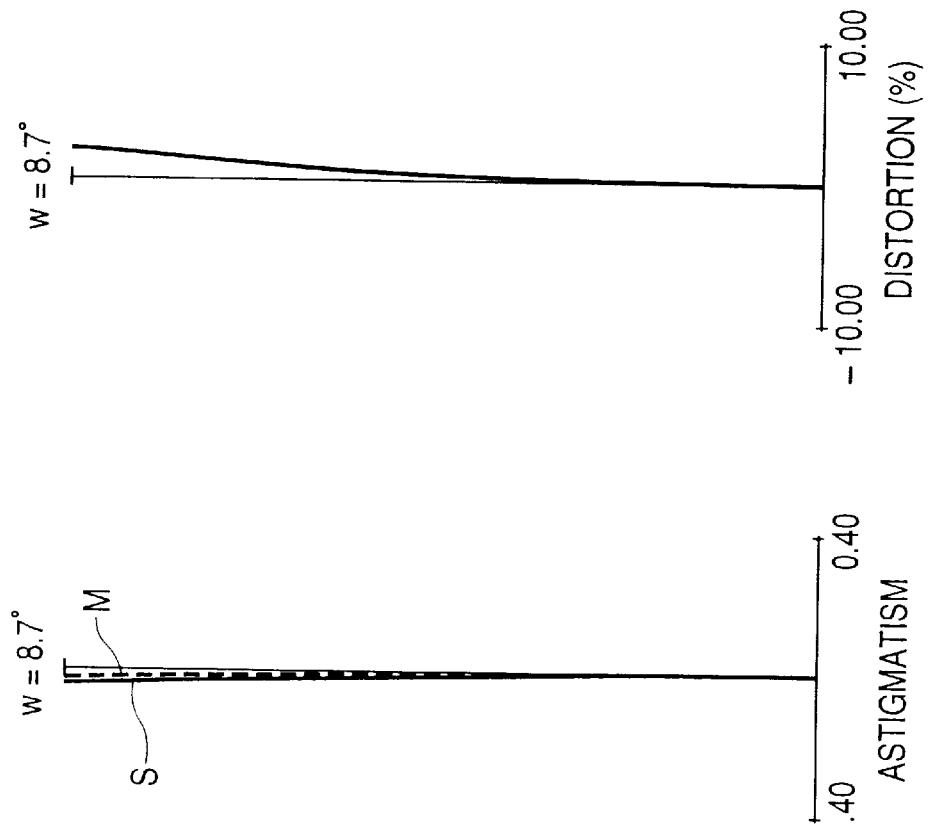
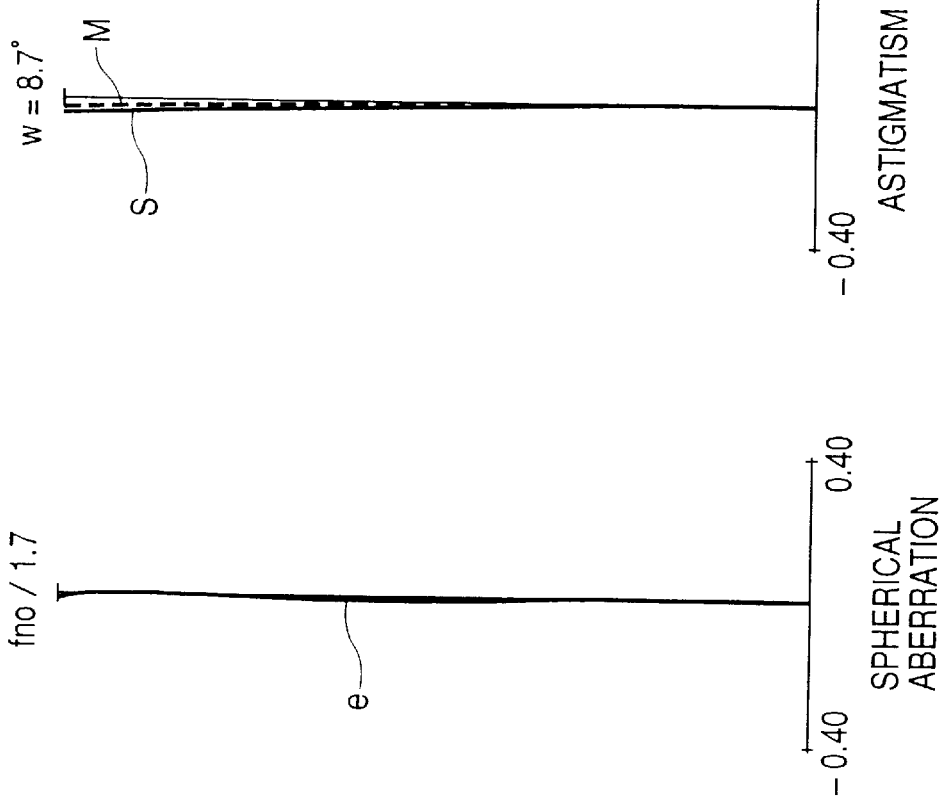

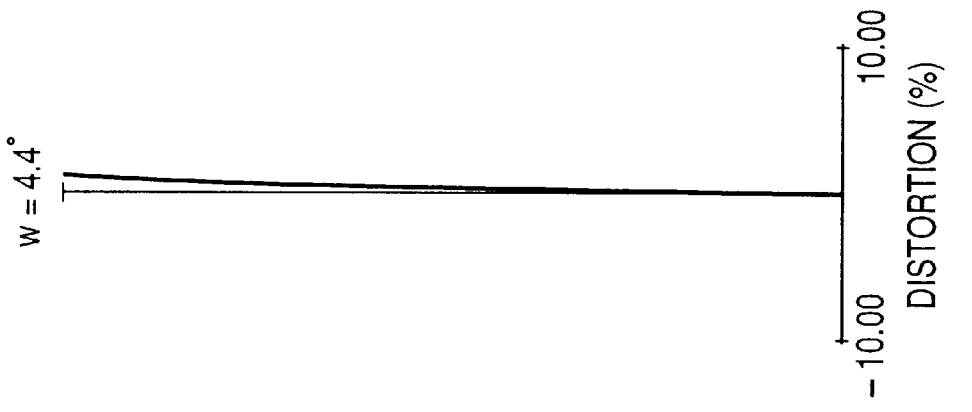
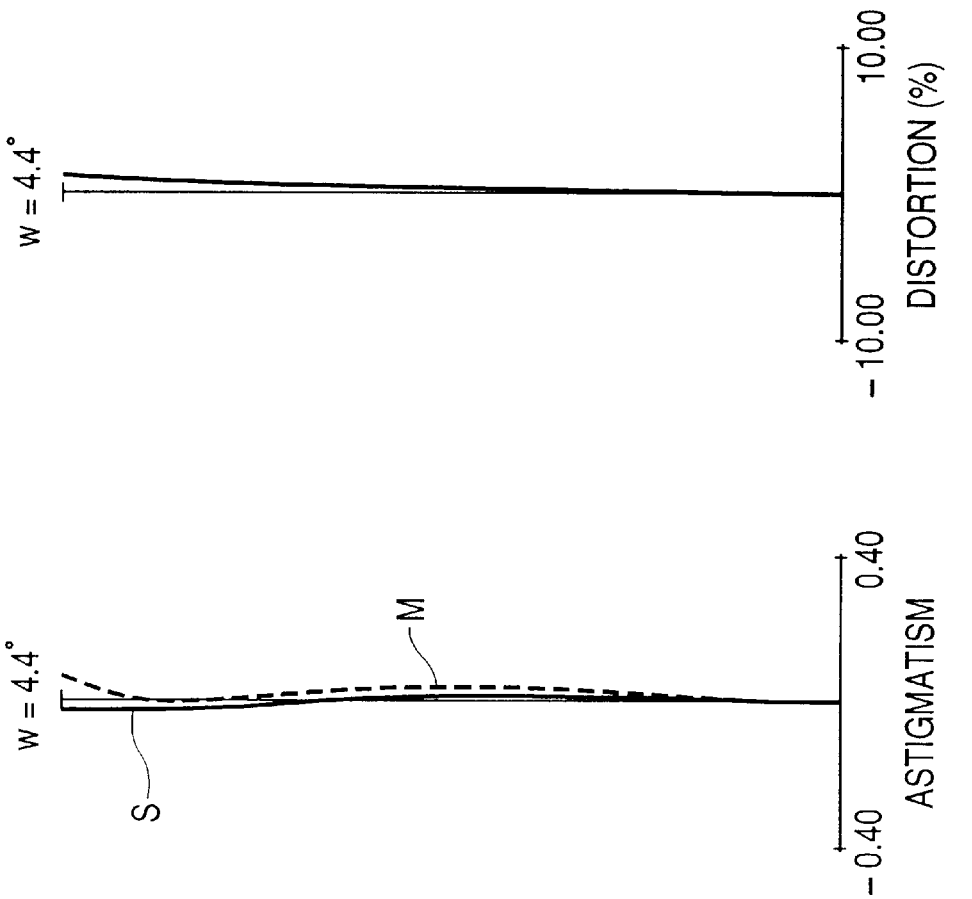
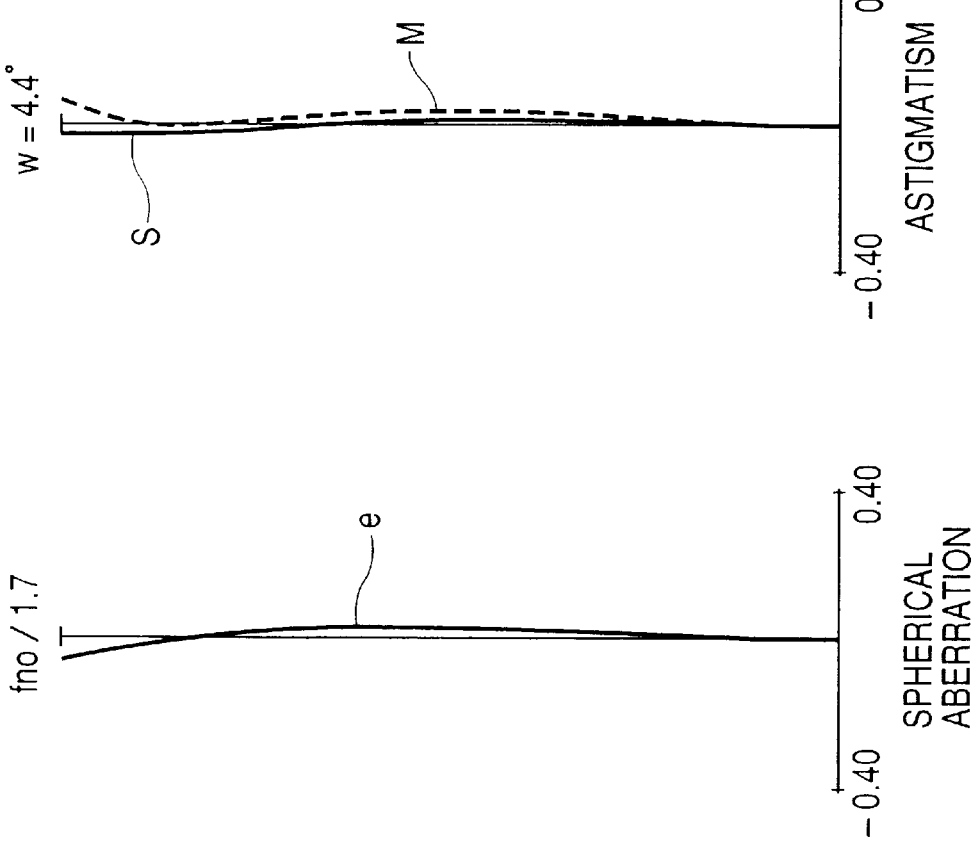

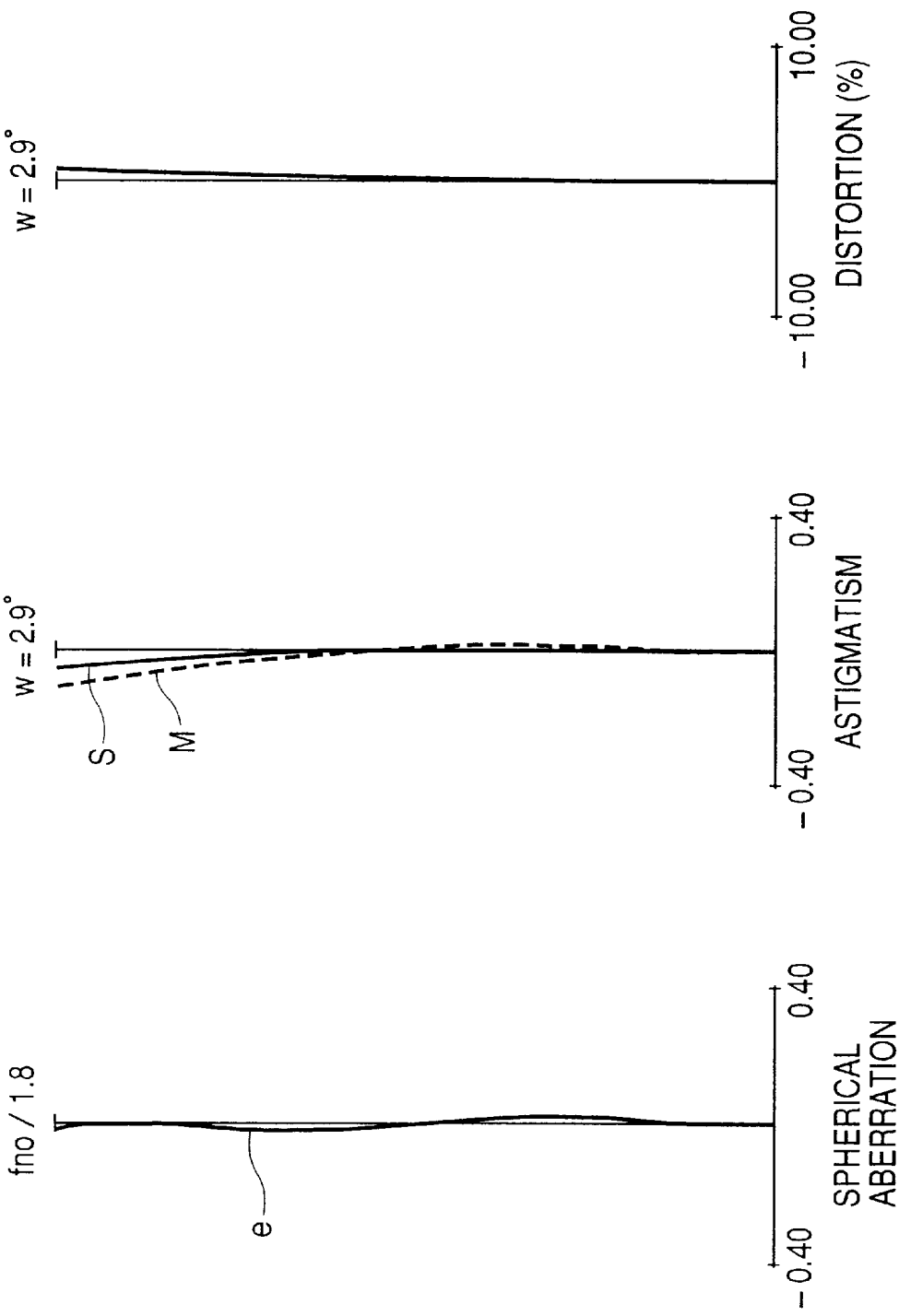

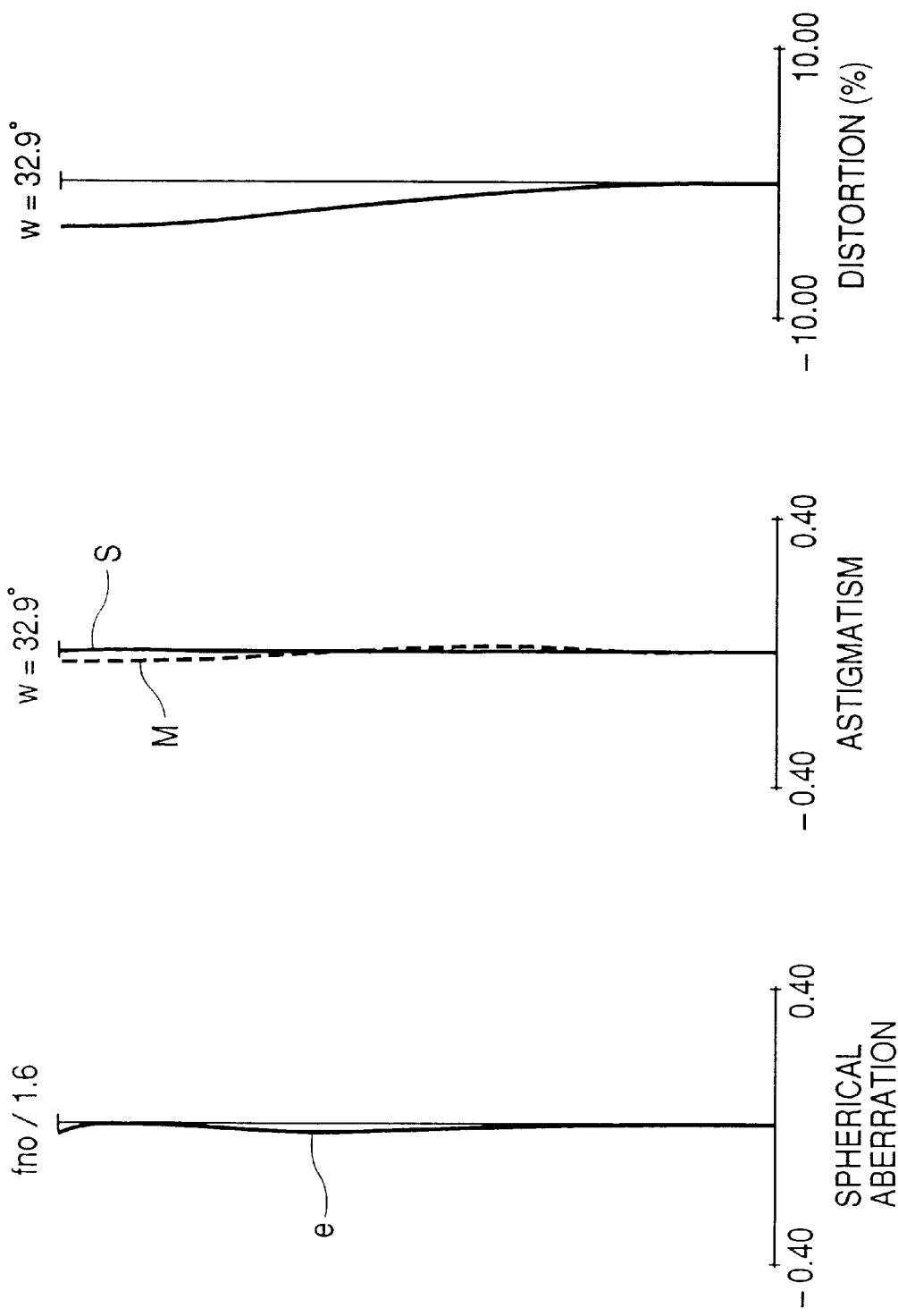

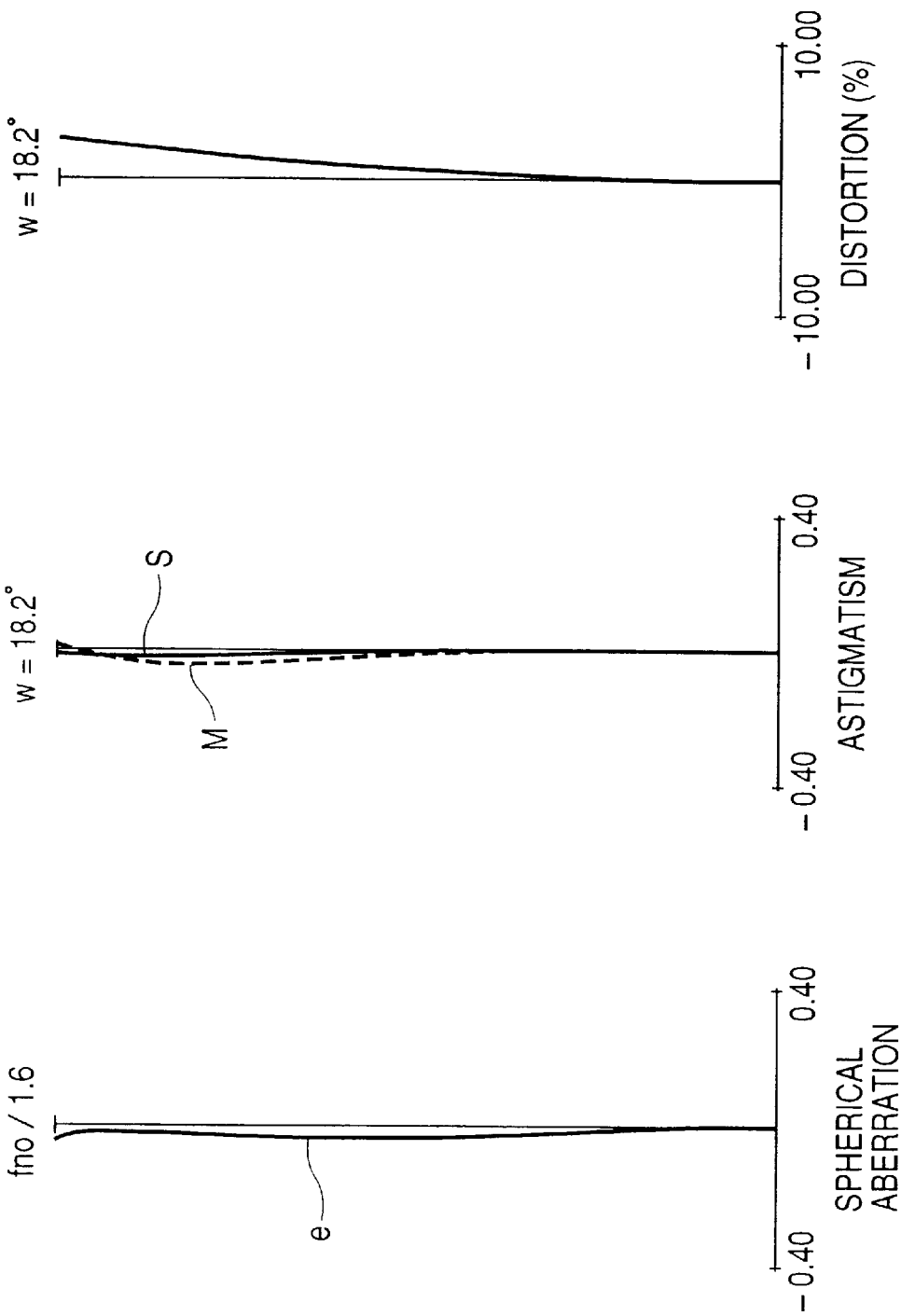

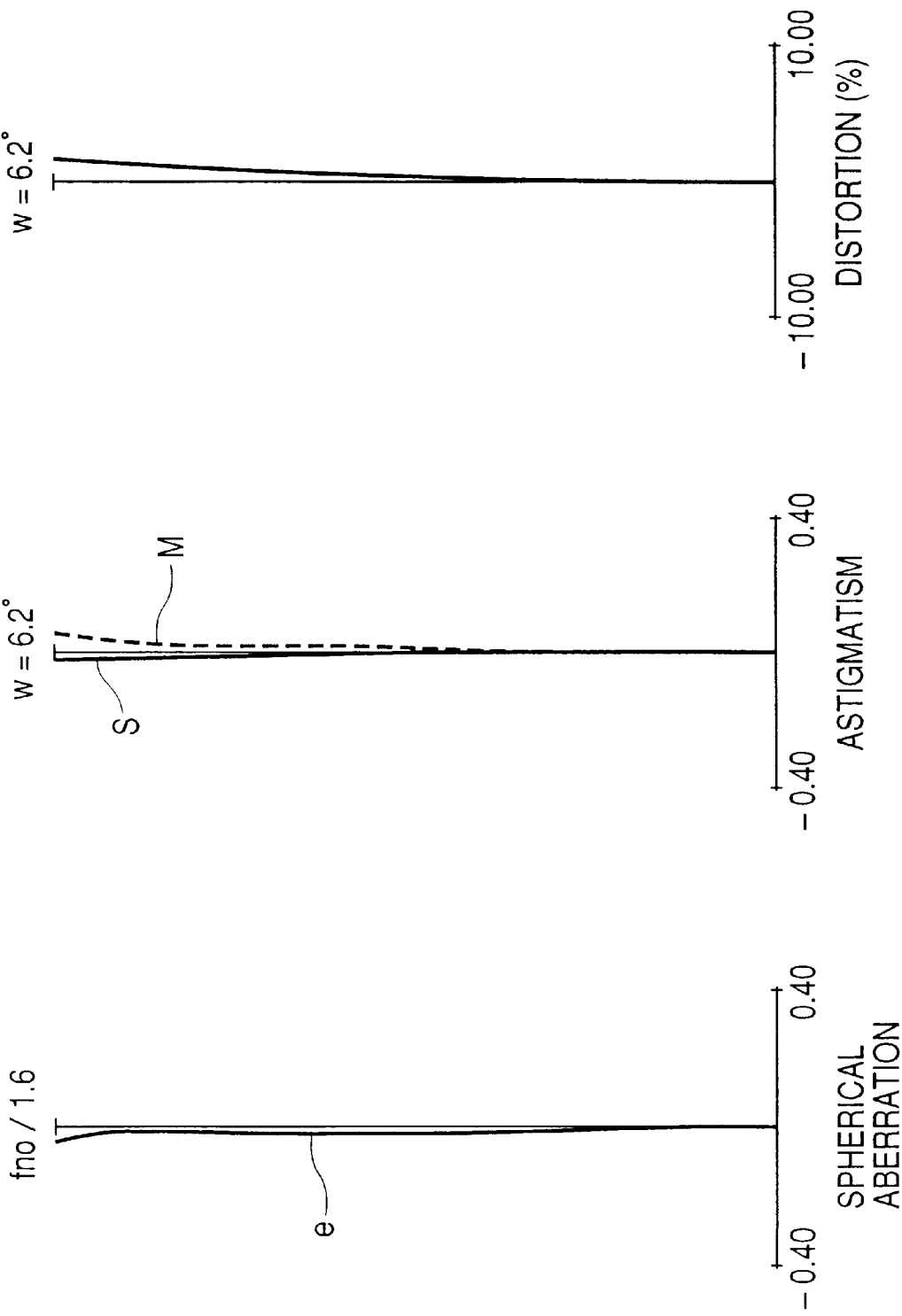

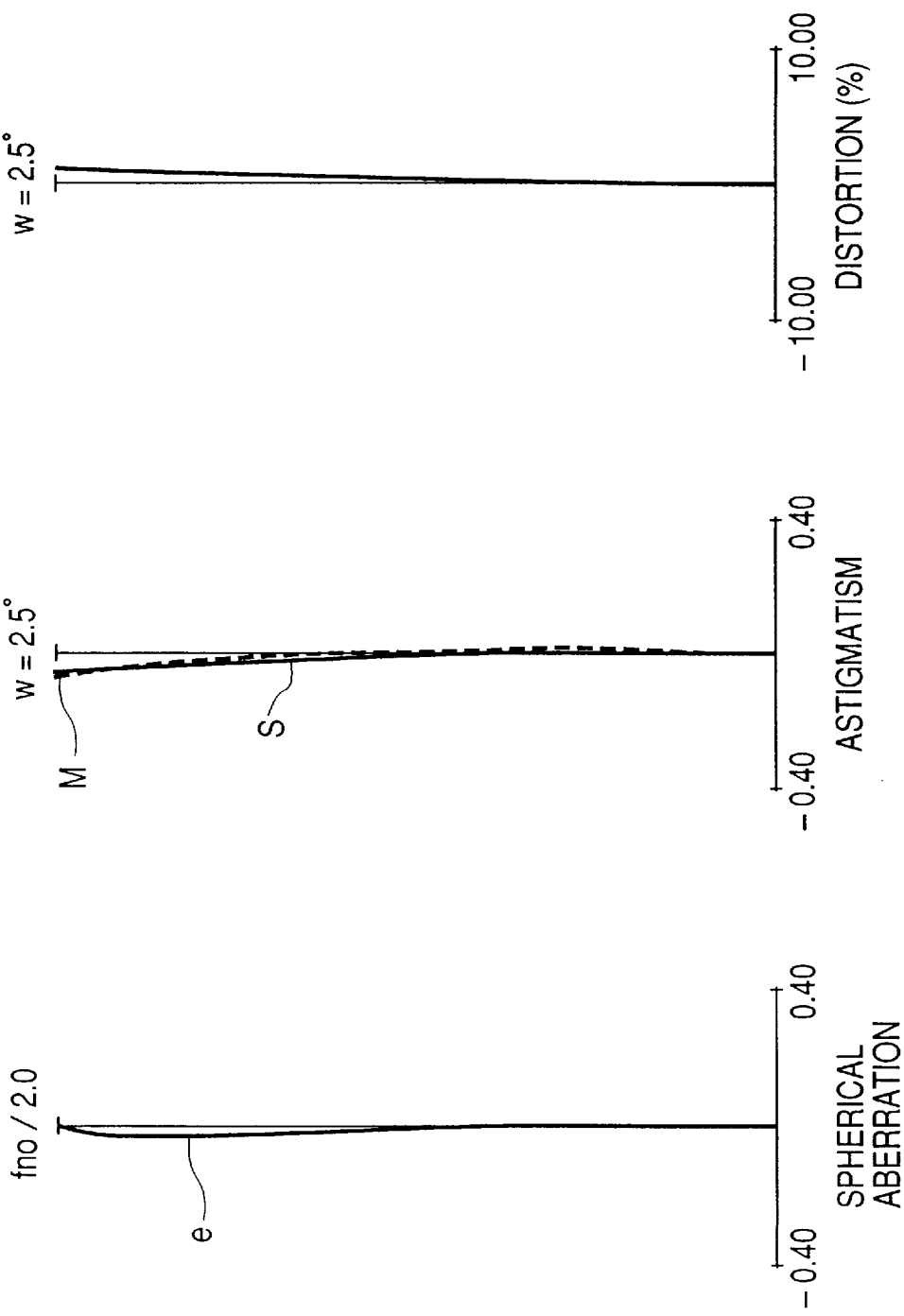

$fm = fw \times Z^{1/4}$ ft (TELEPHOTO END)

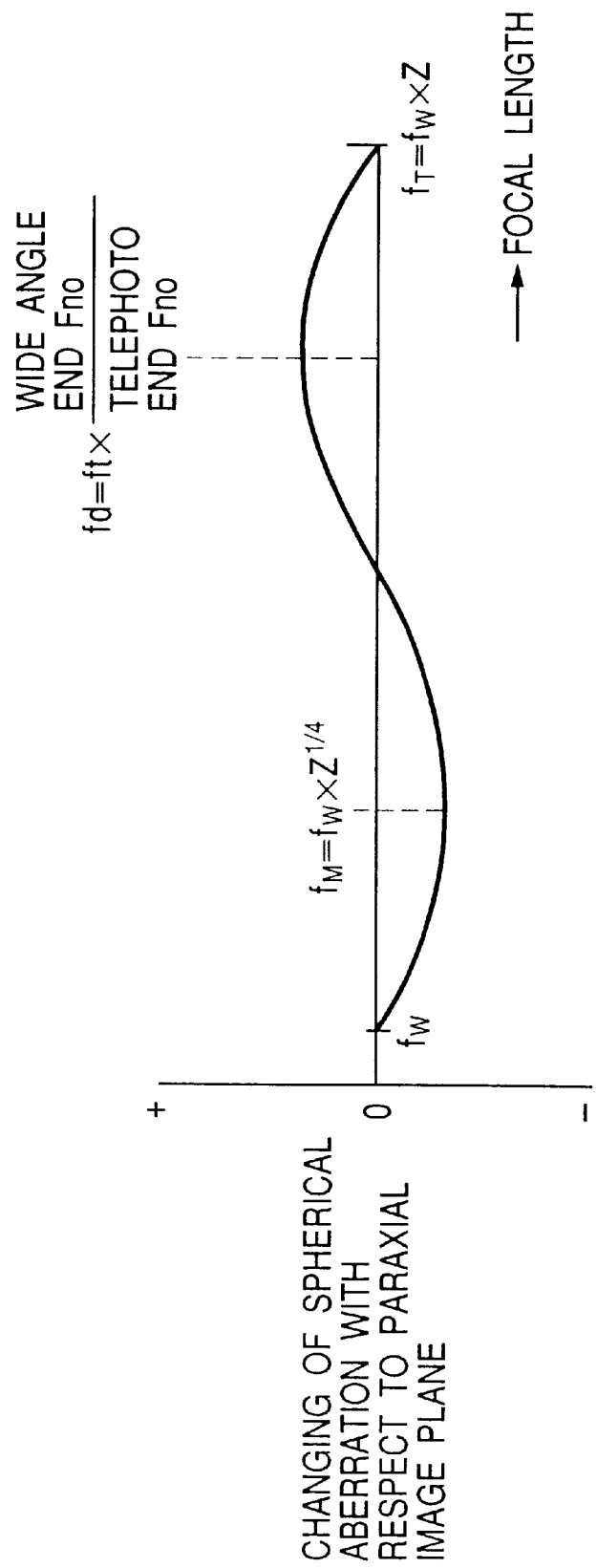

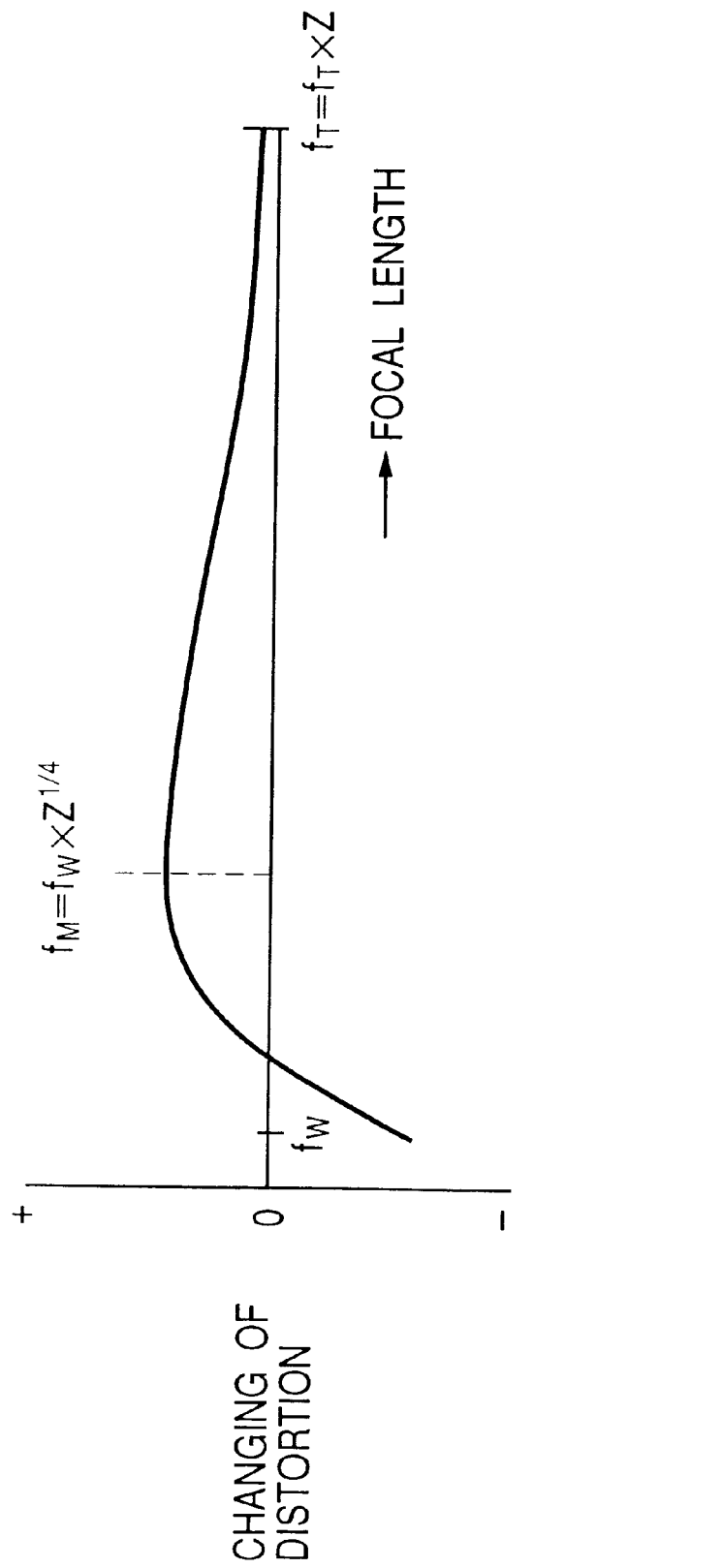

ZOOM LENS

BACKGROUND OF THE INVENTION

1. Field of the Invention

The present invention relates to a zoom lens, and more particularly to a zoom lens having a large aperture in order of an F-number of 1.7 at the wide angle end, a wide image angle (image angle 2ω at the wide angle end of 58° to 70°), a large zooming ratio of 12 to 35 and satisfactory optical characteristics over the entire zoom range, through effective use of aspherical surface in a part of the lens system, adapted for use in a television camera, a phototaking camera, a video camera or the like.

2. Related Background Art

For use in the television camera, phototaking camera, video camera or the like, there has been desired a zoom lens, having a large aperture, a high zoom ratio and highly optical characteristics.

In addition, operability and mobility are important factors particularly in the color television camera for broadcasting purpose, and, responding to such requirements, the image pickup device has become principally composed of small CCD (solid-state image pickup device) such as of ⅔ inch or ½ inch.

Since such a CCD has substantially uniform resolving power over the entire image pickup area, the zoom lens to be used in combination is required to have substantially uniform resolving power from the center to the peripheral part of the image area.

There are required high optical characteristics with satisfactory correction of various aberrations such as astigmatism, distortion and magnificational chromatic aberration. There are also required a compact dimension and a light weight with a large aperture, a wide image angle, a high zoom ratio, and a long back focus in order to dispose a color separating optical system or various kinds of filters in front of the image pickup means.

The so-called 4-unit zoom lens, consisting, in the order from the object side, of a first focusing lens unit (focusing group) of a positive refractive power, a second zooming lens unit of a negative refractive power, a third lens unit of a positive or negative refractive power for correcting the image plane varying with the zooming operation, and a fourth imaging lens unit of a positive refractive power, is widely employed as the zoom lens for the broadcasting color television cameras, since such zoom lens configuration can easily achieve a relatively high zoom ratio and a large aperture.

Among such 4-unit zoom lenses, a configuration capable of providing a large aperture of an F-number in the range of about 1.6 to 1.9 and a high zoom ratio of about 13 is proposed for example in the Japanese Patent Laid-Open Application No. 54-127322.

In order to achieve a large aperture (F-number of 1.7 to 1.8), a high zoom ratio (zoom ratio of 12 to 35), a wide image angle (wide angle end image angle 2ω=58° to 70°) and satisfactory optical characteristics over the entire zooming range in the zoom lens, it is necessary to properly select the refractive power of each lens unit and the constitution lenses.

For example, in order to obtain high optical performance with little variation of the aberrations over the entire zooming range, it is generally necessary to increase the number of lenses in each lens unit, thereby increasing the freedom in correcting the aberration.

For this reason, in the zoom lens of a large aperture, a wide image angle and a high zoom ratio, a number of lenses inevitably becomes larger to increase the dimension of the entire lens system whereby it becomes impossible to meet the requirements of compactness and light weight.

In relation to the imaging performance, there is at first considered the variation of so-called best image plane, at the center of the image area where the image contrast is highest, by the zooming operation. Such variation results mainly from variation of the spherical aberration corresponding to the zooming operation. Such spherical aberration, causing an influence by the cube of the aperture in the region of the third-order aberration coefficient, is the largest difficulty in achieving a large aperture.

In general, for a zoom ratio Z and a focal length fw at the wide angle end, the variation of the spherical aberration caused by the zooming operation assumes, as shown in FIG. 29, an under (minus) side relative to the Gauss image plane from the wide angle end where the spherical aberration is zero to about a zoom position $fm=fw \times Z^{1/4}$, but such tendency becomes less beyond such zoom position. Then the variation becomes zero at a certain zoom position, and then assumes an over (plus) side.

As explained above, fw indicates the focal length at the wide angle end, and Z indicates the zoom ratio.

This over (plus) tendency becomes strongest in the vicinity of a zoom position $fd=(Fno.w/Fno.t) \times ft$ corresponding to the starting point of so-called F drop where the F-number starts to increase (the lens system starting to get darker), but decreases toward the telephoto end beyond this zoom position and becomes approximately zero at the telephoto end.

In the foregoing, Fno.w and Fno.t are respectively the F-numbers at the wide angle end and at the telephoto end, and ft is the focal length at the telephoto end.

Consequently it is extremely difficult to control the spherical aberration at the telephoto side, particularly in a zoom lens having the start position of F-drop.

Then in expanding the image angle of the zoom lens, the distortion aberration poses the largest difficulty in the imaging performance, since the distortion aberration influences by the cube on the image angle in the area of third-order aberration coefficient.

As shown in FIG. 30, the distortion aberration is considerably under (minus) at the wide angle end (focal length fw). It then gradually increases to the over (plus) side from the wide angle end fw toward the telephoto side (focal length ft). Then, after passing through a position where the distortion aberration is zero, such over tendency becomes largest in the vicinity of a zoom position $fm=fw \times Z^{1/4}$. Such over tendency gradually decreases from the focal length fm to the telephoto end ft. Since this behavior becomes larger with the increase of the image angle at the wide angle end, the distortion aberration becomes extremely difficult to control at the wide angle side in increasing the image angle of the zoom lens.

The satisfactory correction of such various aberrations over the entire zooming range has been achieved by increasing the number of lenses in the focusing lens unit or in the zooming lens unit. For this reason the entire lens system has become large and complex.

In order to solve such drawbacks the introduction of an aspherical surface is proposed for example in the Japanese Patent Laid-Open Application No. 8-184758.

However in the recent zoom lenses of improved specifications with a large aperture and a high zoom ratio starting from a super wide image angle, it is becoming necessary to restudy the method of use of the aspherical surface.

In a zoom lens of a large aperture with a high zoom ratio starting from an ultra wide image angle, the spherical aberration varies greatly at the telephoto side while the distortion aberration varies greatly at the wide angle side. In order to satisfactorily correct both aberrations, it is necessary to introduce an aspherical surface in an appropriate position of the zooming part.

SUMMARY OF THE INVENTION

The object of the present invention is to provide a zoom lens of a large aperture and a high zoom ratio, having an F-number of about 1.7 at the wide angle end, a wide image angle (image angle 2ω of about 58° to 70° at the wide angle end), a zoom ratio of about 12 to 35, and satisfactory optical performance over the entire zooming range, by properly setting the refractive power and the F-number of each lens unit in a so-called 4-unit zoom lens and introducing an aspherical surface in at least a lens surface, thereby reducing the variation of various aberrations in the zooming operation, particularly correcting the spherical aberration at the telephoto side and the distortion aberration at the wide angle side.

The above-mentioned object can be attained, according to the present invention, by a zoom lens comprising, in order from the object side, a first lens unit of a positive refractive power which is fixed at the zooming operation, a second lens unit of a negative refractive power for zooming operation, a third lens unit for correcting the variation of the image plane at the zooming operation, and a fixed fourth lens unit of a positive refractive power; further including a lens V1 having at least an aspherical surface AS1 which satisfies conditions 1.25<hw/ht and 1.32<hw/hz wherein Z is the zoom ratio, ht is the maximum height of incidence of the axial ray, hw is the maximum height of incidence of the off-axial ray at the maximum image angle at the wide angle end, and hz is the maximum height of incidence of the off-axial ray of the maximum image angle at a zoom ratio $Z^{1/4}$; and further satisfying conditions:

$$1.0 < f21/f2 < 1.8 \tag{1}$$

$$1.8 \times 10^{-3} < |\Delta 10/f2| < 4.6 \times 10^{-2}$$

$$7.7 \times 10^{-4} < |\Delta 9/f2| < 3.4 \times 10^{-2} \tag{2}$$

$$1.0 \times 10^{-4} < |\Delta 7/f2| < 1.7 \times 10^{-2}$$

wherein f2 is the focal length of the second lens unit; f21 is the focal length of the lens V1; and the aspherical surface AS1, if applied to a positive refractive surface, assumes such a form that the positive refractive power increases toward the peripheral part of the lens but, if applied to a negative refractive surface, assumes such a form that the negative refractive power decreases toward the peripheral part of the lens; and Δ10, Δ9 and Δ7 indicate the amounts of asphericity of the aspherical surface AS1 respectively at 100%, 90% and 70% of the effective diameter of the lens.

The zoom lens also satisfies conditions:

$$10 < Z$$

$$0.8 < Fno.1 < 1.6 \tag{3}$$

$$-0.45 < \beta 2w < -0.15 \tag{4}$$

wherein ft and Fno.t are respectively the focal length and the F-number of the entire lens system at the telephoto end, f1 and Fno.1=f1(ft/Fno.t) are the focal length and the F-number of the first lens unit, β2w is the lateral magnification of the second lens unit at the wide angle end, and Z is the zoom ratio.

Also the second lens unit is composed, in order from the object side, the aforementioned lens V1, a lens V2 having at least a positive lens and a negative lens and showing a negative refractive power in total, and a lens V3 having at least a positive lens and a negative lens and showing a positive refractive power in total.

There are further satisfied conditions:

$$3.5 < |\Delta v22|/|\Delta v23| \tag{5}$$

$$0.17 < |\Delta n23| \tag{6}$$

wherein Δv22 is the difference of Abbe's numbers of the positive lens and the negative lens of the lens V2, Δμ23 is the difference of Abbe's numbers between the positive lens and the negative lens of the lens V3, and Δn23 is the difference between the refractive indexes of the positive lens and the negative lens of the lens V3.

BRIEF DESCRIPTION OF THE DRAWINGS

FIGS. 5A, 5B and 5C are aberration charts of an embodiment 1 of the present invention at a focal length f=8.0;

FIGS. 6A, 6B and 6C are aberration charts of an embodiment 1 of the present invention at a focal length f=16.9;

FIGS. 7A, 7B and 7C are aberration charts of an embodiment 1 of the present invention at a focal length f=48.0;

FIGS. 8A, 8B and 8C are aberration charts of an embodiment 1 of the present invention at a focal length f=115.2;

FIGS. 9A, 9B and 9C are aberration charts of an embodiment 1 of the present invention at a focal length f=160.0;

FIGS. 10A, 10B and 10C are aberration charts of an embodiment 2 of the present invention at a focal length f=10.0;

FIGS. 11A, 11B and 11C aberration charts of an embodiment 2 of the present invention at a focal length f=24.3;

FIGS. 12A, 12B and 12C are aberration charts of an embodiment 2 of the present invention at a focal length f=60.0;

FIGS. 13A, 13B and 13C are aberration charts of an embodiment 2 of the present invention at a focal length f=184.0;

FIGS. 15A, 15B and 15C are aberration charts of an embodiment 3 of the present invention at a focal length f=9.0;

FIGS. 16A, 16B and 16C are aberration charts of an embodiment 3 of the present invention at a focal length f=16.8;

FIGS. 17A, 17B and 17C are aberration charts of an embodiment 3 of the present invention at a focal length f=36.0;

FIGS. 18A, 18B and 18C are aberration charts of an embodiment 3 of the present invention at a focal length f=72.0;

FIGS. 19A, 19B and 19C are aberration charts of an embodiment 3 of the present invention at a focal length f=108.0;

FIGS. 20A, 20B and 20C are aberration charts of an embodiment 4 of the present invention at a focal length f=8.5;

FIGS. 21A, 21B and 21C are aberration charts of an embodiment 4 of the present invention at a focal length f=16.7;

FIGS. 22A, 22B and 22C are aberration charts of an embodiment 4 of the present invention at a focal length f=51.0;

FIGS. 24A, 24B and 24C are aberration charts of an embodiment 4 of the present invention at a focal length f=127.5;

FIGS. 29 and 30 are charts showing variation of the aberration resulting from the zooming operation of a zoom lens.

DETAILED DESCRIPTION OF THE PREFERRED EMBODIMENTS

Figure 1:
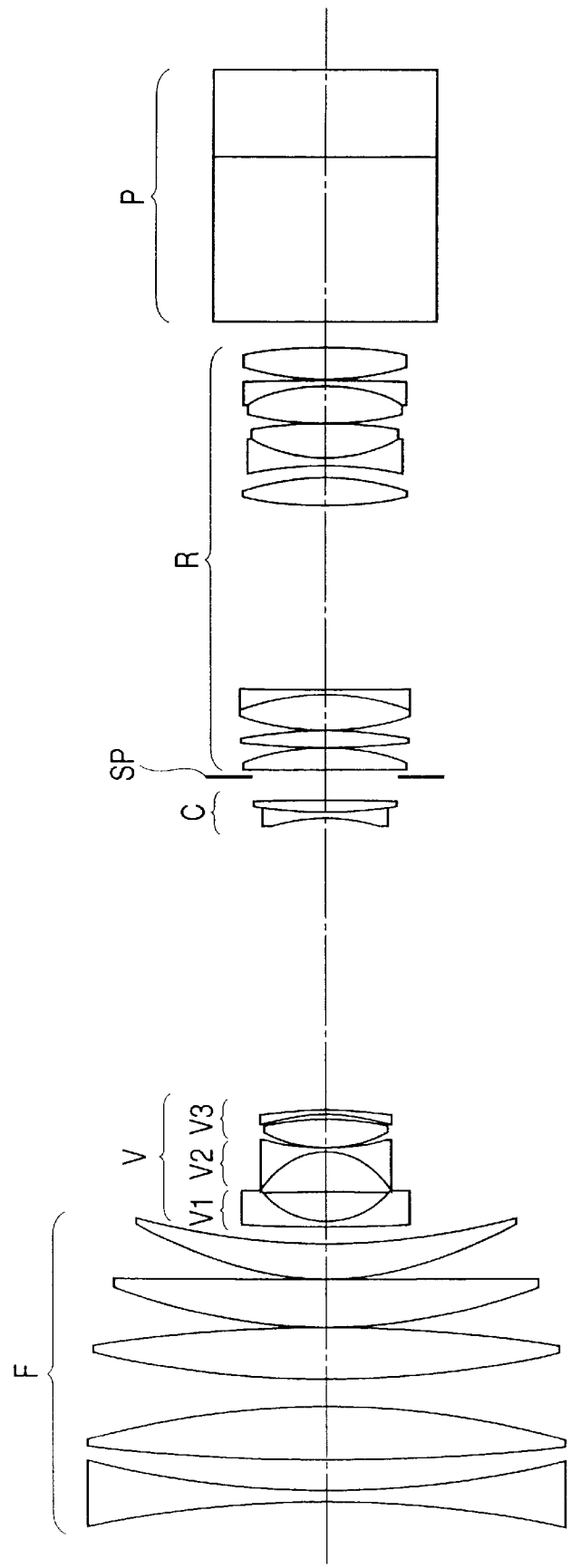
FIG. 1 is a cross-sectional view of a lens of a numerical example 1 of the present invention at the wide angle end.

FIGS. 1 to 4 are cross-sectional views of lenses of numerical examples 1 to 4 of the present invention at the wide angle end.

In FIGS. 1 to 4, a first lens unit F is a focusing unit (front lens unit) of a positive refractive power.

A second lens unit V is a variator of a negative refractive power for zooming, and achieves zooming from the wide angle end to the telephoto end by monotonous (monotonic) movement on the optical axis toward the image plane. A third lens unit C is a compensator of a negative refractive power and is non-linearly moved on the optical axis with a trajectory convex to the object side, in order to correct the variation of the image plane resulting from the zooming operation. The variator V and the compensator C constitute a zooming system. The variator (second lens unit) V consists of lenses V1 to V3 as will be explained later.

SP indicates a stop, and a fourth lens unit R is a fixed relay unit of a positive refractive power. P indicates a color separation prism, an optical filter of the like, represented as a glass block in these drawings.

The zoom lenses shown in FIGS. 1 to 4 satisfy the aforementioned conditions thereby satisfactorily correcting the variations of aberrations over the entire zooming range and attaining high optical performance.

In the following there will be explained the features of the aspherical surface in the zoom lens of the present invention.

In a zoom lens having an image angle (2ω) of about 58° to 70° at the wide angle end and a zoom ratio of about 12 to 35, the height of incidence of the axial ray into the front lens unit and the variator unit progressively increases from the wide angle end to the telephoto end as shown in FIGS. 25 to 28, and becomes highest at the F-drop start position (zoom position fd in FIG. 27) in a zoom lens showing such F-drop. At the telephoto end, such height becomes constant in the front lens unit and lower in the variator because of the F-drop phenomenon.

On the other hand, the height of incidence of the off-axial ray corresponds to the effective full diameter of the variator at the wide angle end, but, at a zoom position $fm=fw \times Z^{1/4}$, the height of the incidence increases rapidly in the front lens unit but decreases rapidly in the variator. This tendency becomes more conspicuous when the zoom lens is designed for a wider image angle, a larger zoom ratio, a smaller dimension and a lighter weight.

In applying an aspherical surface to the variator for suppressing the variation of the aberrations, a single aspherical surface is unable to efficiently correct the distortion aberration which varies mainly at the wide angle side and the spherical aberration which varies mainly at the telephoto side. Since the shape of the aspherical surface and the amount of asphericity thereof are significantly different for correcting the distortion aberration and the spherical aberration as they are mutually quite different in the nature of the aberration, the application of asphericity for correcting either aberration results in a detrimental influence such as a higher-order aberration in the other.

For this reason, in order to correct the distortion aberration which influences by the cube of the image angle, the present embodiment is provided, in the lens surface constituting the variator, with a lens V1 including at least an aspherical surface satisfying conditions 1.25<hw/ht and 1.32<hw/hz, wherein ht is the maximum height of incidence of the axial ray in the lens surfaces constituting the variator in the entire zooming range, hw is the maximum height of incidence of the off-axial ray of the maximum image angle at the wide angle end, and hz is the maximum height of incidence of the maximum image angle at a zoom position corresponding to the zoom ratio $Z^{1/4}$.

This aspherical surface is desirably so shaped, in order to correct the variation in the distortion aberration at the wide angle side, that the positive refractive force becomes stronger toward the peripheral part of the lens when the aspherical surface is employed in a positive refractive surface in the variator V, or that the negative refractive force becomes weaker toward the peripheral part of the lens when the aspherical surface is applied to a negative refractive surface. Such shape allows to satisfactorily correct the distortion aberration of the under (minus) side in the vicinity of the wide angle end.

However such aspherical shape is detrimental for the distortion aberration at the zoom position corresponding to the zoom ratio $Z^{1/4}$, and enhances, by the aspherical effect, the distortion aberration of the over (plus) side resulting from the strong positive refractive power of the front lens unit at the zoom position corresponding to the zoom ratio $Z^{1/4}$, whereby the distortion aberration becomes difficult to control.

The above-described condition 1.25<hw/ht indicates that the off-axial ray passes only in the vicinity of the wide angle end in the entire zooming range and that the height of incidence is significantly different from the height of incidence of the axial ray at the telephoto side, thereby suppressing the influence on the variation of the spherical aberration at the telephoto side while satisfactorily correcting the distortion aberration at the wide angle end in realizing a larger image angle. In addition the above-described condition 1.32<hw/hz indicates that the off-axial ray passes only in the vicinity of the wide angle end in the entire zooming range and that the height of incidence is significantly different from the height of incidence of the off-axial ray of the maximum image angle in the vicinity of the zoom position corresponding to the zoom ratio $Z^{1/4}$, thereby suppressing the influence on the variation of the spherical aberration in the telephoto side, while satisfactorily correcting the distortion aberration at the wide angle end in realizing a larger image angle.

In the variator V, above the upper limit of the condition (1), the negative refractive power of the lens V1 becomes excessively large, so that the correction of aberration by the aspherical surface becomes difficult. Also above the upper limit of the condition (1), the front principal point of the variator V becomes disposed within the variator V, thus becoming detrimental to the reduction of dimension of the lens.

Also in the present embodiments, in order to satisfactorily correct the distortion aberration at the wide angle end for achieving a wider image angle, the aspherical surface of the lens V1 in the variator is so shaped to be substantially spherical (or flat) in the central portion as to satisfy the aforementioned condition (2) and the asphericity increases toward the peripheral part of the surface.

The above-mentioned condition (2) is to cause the variator unit of the zoom lens to exhibit the correcting effect of the aspherical surface on the distortion aberration only in a very limited zooming range in the vicinity of the wide angle end, among the entire zooming range, and to reduce the influence on the spherical aberration, astigmatism and coma aberration in order zooming range.

In the present embodiments, in order to realize a zoom lens having a zoom ratio Z exceeding 10 (10<Z) and a large aperture over the entire zooming range, there is employed a bright front lens unit F satisfying the condition (3), thereby realizing simultaneously a large diameter and a compact dimension of the entire lens system, while satisfactorily correcting the spherical aberration at the telephoto end.

Below the lower limit of the condition (3), the share of the aberrations to be borne by the front lens unit F at the telephoto side increases rapidly, so that the satisfactory correction of the variation of the spherical aberration becomes difficult to achieve, and, above the upper limit of the condition (3), it becomes difficult to achieve the large aperture and the compact dimension.

In addition, the variator V is so selected that the lateral magnification thereof satisfies the condition (4), thereby realizing satisfactory optical performance with little variation of the aberrations over the entire zooming range, while securing the desired zooming range.

Below the lower limit of the condition (4), the high zoom ratio is difficult to achieve, and, above the upper limit, the share of the aberrations to be borne by the variator unit in the correction increases rapidly, whereby it becomes difficult to reduce the variation of the aberrations and to achieve high optical performance over the entire zooming range.

Figure 2:
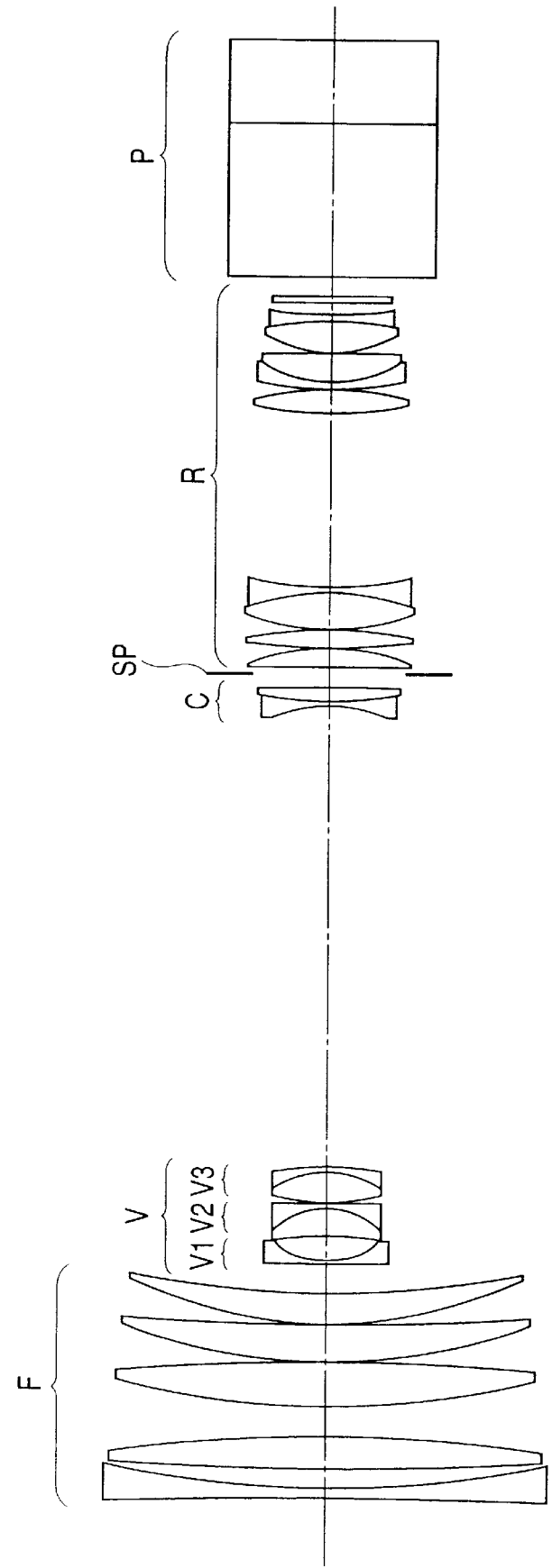
FIG. 2 is a cross-sectional view of a lens of a numerical example 2 of the present invention at the wide angle end.
Figure 3:
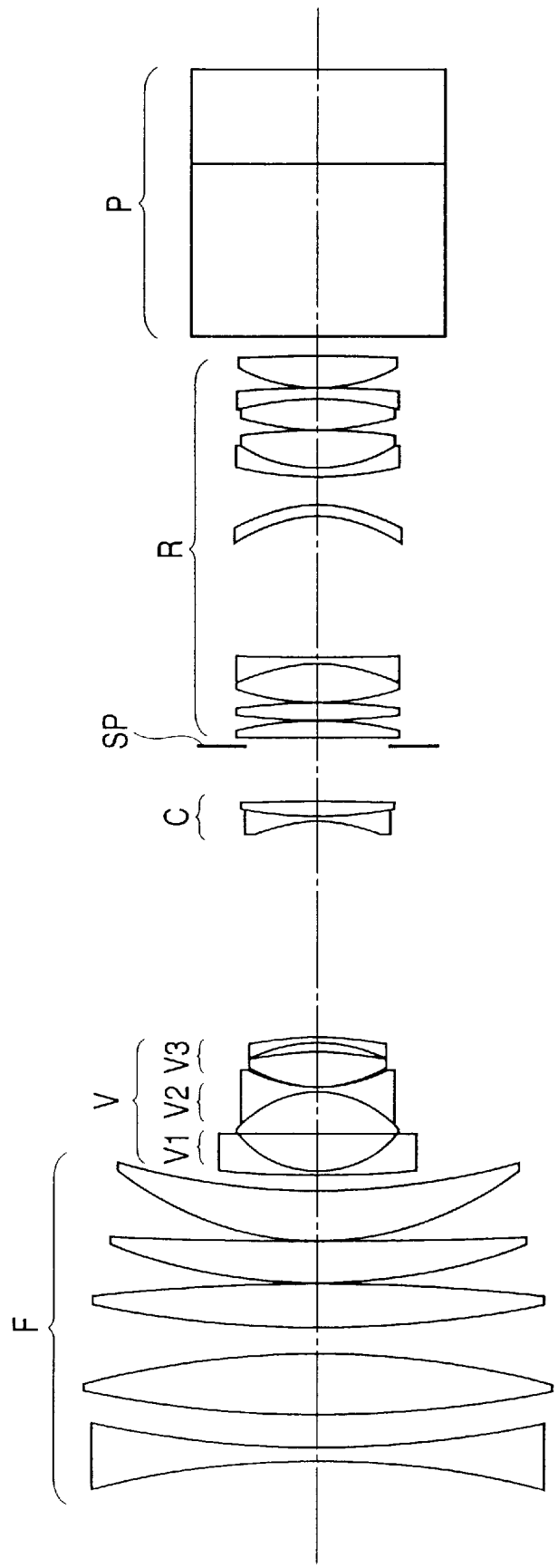
FIG. 3 is a cross-sectional view of a lens of a numerical example 3 of the present invention at the wide angle end.

Also in the embodiments shown in FIGS. 1 to 3, the variator is composed, in addition to the aforementioned lens V1, a lens V2 of a negative refractive power consisting of a positive lens and a negative lens, and a lens V3 of a positive refractive power, consisting of a positive lens and a negative lens, both positioned behind the lens V1, thereby satisfying the conditions (5) and (6). The condition (4), satisfied by the negative refractive power of the lenses V1, V2 and the positive refractive power of the lens V3, provides effects of displacing the front principal point of the variator V to the front side thereof and of canceling principally the spherical aberration in the variator V.

Also the condition (5), satisfied by constituting each of the lenses V2 and V3 with a positive lens and a negative lens, achieves correction of the chromatic aberration and, in particular, the magnificational chromatic aberration. As the variator V is composed of three lens units V1, V2 and V3, the thickness in the optical axial direction increases, and, if the correcting plane for achromaticity in the variator is positioned closer to the image plane, the wavelength-dependent shift in the position of the principal point of the variator becomes larger, thereby generating a significant magnificational chromatic aberration. Consequently the condition (5) is introduced to dispose the correcting plane for achromaticity in the variator closer to the object side, thereby satisfactorily correcting the magnificational chromatic aberration.

Also the lens V3 is composed of a positive lens and a negative lens so as to satisfy the condition (6) thereby correcting the coma aberration particularly in the telephoto side. The positive lens and the negative lens constituting the lens V3 are either mutually adhered or separated in consideration of the influence on the high-order aberrations, but if the difference of the two lenses in the refractive index exceeds the lower limit of the condition (6) when they are mutually adhered, the diverging effect for the coma aberration is significantly lost.

Furthermore, in the present embodiments, in order to correct the variation of the somewhat remaining spherical aberration at the telephoto side, an aspherical surface is applied to at least a surface of the front lens unit F or the lens V3 in the variator V.

In case such aspherical surface for correcting the variation of the spherical aberration at the telephoto side is applied to a positive refractive surface in the front lens unit F, such aspherical surface is so shaped that the positive refractive power becomes weaker toward the peripheral part of the lens. On the other hand, if it is introduced into a negative refractive surface, it is so shaped that the negative refractive power becomes stronger toward the peripheral part of the lens. Such shape corrects the under (minus) spherical aberration at the telephoto end, thereby satisfactorily suppressing the variation of the spherical aberration at the telephoto side. Such an aspherical surface provides an additional effect of suppressing the over (plus) distortion aberration, resulting from the strong upshift of the off-axial ray by the positive refractive power of the front lens unit, caused by the rapid increase of the height of incidence of the off-axial ray in the front lens unit at a zoom position $fm = fw \times Z^{1/4}$. More specifically, in a front lens unit having a large height of incidence of the axial ray at the telephoto side and showing a large variation of the height of incidence of the off-axial ray at the wide angle side, the aspherical surface can be very effectively introduced in a lens surface at the object side.

On the other hand, in case such aspherical surface for correcting the variation of the spherical aberration at the telephoto side is applied to a positive refractive surface of the lens V3 in the variator V, such aspherical surface is so shaped that the positive refractive power becomes stronger toward the peripheral part of the lens, but, if it is applied to a negative refractive surface, it is so shaped that the negative refractive power becomes weaker toward the peripheral part of the lens. Such shape allows to satisfactorily suppress the variation of the spherical aberration at the telephoto side, which assumes the over (plus) side at the F-drop start position. This configuration utilizes the F-drop start position in the variator of the zoom lens having a suitable F-drop and the variation in the height of incidence of the axial ray at the telephoto end. In the variator, the variation in the height of incidence of the axial ray between the F-drop start position and the telephoto end becomes largest in the lens V3, as will be apparent from the comparison of FIGS. 27 and 28.

In case where the aspherical surface for correcting the variation of the spherical aberration at the telephoto side is applied to at least a lens surface of the front lens unit F and at least a lens surface of the lens V3 in the variator V, it is made possible to more satisfactorily correct the variation of the spherical aberration at the telephoto side, as the aspherical surfaces exhibit the effect at respectively different zoom positions.

As explained in the foregoing, the present embodiments satisfactorily correct the variation of the distortion aberration at the wide angle side and the spherical aberration at the telephoto side through appropriate setting of the aspherical lens surface, thereby attaining high optical performance over the entire zooming range.

In the following there will be explained the features of the embodiments (numerical examples) of the present invention.

The zoom lens of the embodiment 1 shown in FIG. 1 has a zoom ratio of 20 and an image angle 2ω at the wide angle end exceeding 69°. R1 to R10 constitute the front lens unit F (first lens unit) having a positive refractive power for focusing. R11 to R19 constitute the variator V (second lens unit) which monotonously moves toward the image plane, for zooming from the wide angle end to the telephoto end. R20 to R22 constitute the compensator C (third lens unit) for correcting the image point associated with the zooming, having a negative refractive power and effecting a movement with a trajectory convex to the object side, in the zooming operation from the wide angle end to the telephoto end. SP (R23) indicates the stop. R24 to R40 constitute a fixed relay unit R (fourth lens unit) having the imaging function, and R41 to R43 represent a glass block equivalent to a color separation prism.

The zoom lens of the embodiment 1 has a large aperture of Fno.1=1.09, wherein the F-number Fno.1 is defined by Fno.1=fl/(ft.Fno.t) as the index of the large aperture. For attaining such large aperture, the front lens unit is composed of five lenses which are concave, convex, convex, convex and convex in order from the object side wherein the concave lens serves to diverge the spherical aberration thereby suppressing the generation of the spherical aberration in the front lens unit.

The lateral magnification β2w at the wide angle end in the variator V is selected as −0.255 in consideration of the zoom ratio of 20. The variator V is composed, in order from the object side, of a lens V1 of a negative refractive power, consisting of a single negative lens having a strongly concave surface toward the image plane and having an aspherical surface in one of the surfaces, a lens V2 of a negative refractive power consisting of a positive lens and a negative lens, and a lens V3 of a positive refractive power consisting of a positive lens and a negative lens, thereby suppressing the generation of the distortion aberration, spherical aberration and coma aberration in the variator. The aforementioned conditions are selected as f21/f2=1.29, |Δv>|/|Δv23|= 11.68 and |Δn23|=0.316.

The aspherical surface is applied to the surfaces R11 and R16. The aspherical surface of the surface R11 effectively utilizes the facts that the off-axial ray passes only in the vicinity of the wide angle end among the entire zooming range and the height of incidence thereof is significantly different from the height of incidence of the axial ray at the telephoto side and that the off-axial ray passes only in the vicinity of the wide angle end among the entire zooming range and the height of incidence thereof is significantly different from the height of incidence of the off-axial ray of the maximum image angle in the vicinity of the zoom position corresponding to the zoom ratio $Z^{1/4}$, and has the conditions hw/ht=1.412 and hw/hz=1.602. The other aspherical surface is applied to R16 in the variator, in order to set a suitable F-drop at the telephoto side thereby utilizing the variation of the height of incidence of the axial ray in the variator at the telephoto side for correcting the aberrations.

Both aspherical surfaces are so shaped that the positive refractive power becomes stronger with the increase of the distance from the optical axis, and utilize the aspherical coefficients B, C, D and E in order to efficiently correct the distortion aberration and the spherical aberration up to the high-order region. The amount of asphericity is 291 and 193 μm in the maximum height of the entering ray, respectively in the surfaces R11 and R16.

FIGS. 5A to 5C to FIGS. 9A to 9C show the spherical aberration, astigmatism and distortion aberration in the different zoom positions.

The zoom lens of the embodiment 2 shown in FIG. 2 has a zoom ratio of 35 and an image angle 2ω at the wide angle end exceeding 57°. R1 to R10 constitute the front lens unit F (first lens unit) having a positive refractive power for focusing. R11 to R18 constitute the variator V (second lens unit) which monotonously moves toward the image plane, for zooming from the wide angle end to the telephoto end. R19 to R21 constitute the compensator C (third lens unit) for correcting the image point associated with the zooming, having a negative refractive power and effecting a movement with a trajectory convex to the object side, in the zooming operation from the wide angle end to the telephoto end. SP (R22) indicates the stop. R23 to R39 constitute the fixed relay unit R (fourth lens unit) having the imaging function, and R40 to R42 represent a glass block equivalent to a color separation prism.

The zoom lens of the embodiment 2 has a large aperture of Fno.1=1.52, wherein the F-number Fno.1 is defined by Fno.1=fl/(ft/Fno.t) as the index of the large aperture. For attaining such large aperture, the front lens unit is composed of five lenses which are concave, convex, convex, convex and convex in order from the object side wherein the concave lens serves to diverge the spherical aberration thereby suppressing the generation of the spherical aberration in the front lens unit.

The lateral magnification β2w of the variator V at the wide angle end is selected somewhat smaller as −0.182 in consideration of the zoom ratio of 35. The variator V is composed, in the order from the object side, of a lens V1 of a negative refractive power, consisting of a single negative lens having a strongly concave surface toward the image plane and having an aspherical surface in one of the surfaces, a lens V2 of a negative refractive power consisting of a positive lens and a negative lens, and a lens V3 of a positive refractive power consisting of a positive lens and a negative lens, thereby suppressing the generation of the distortion aberration, spherical aberration and coma aberration in the variator. The aforementioned conditions are selected as f21/f2=1.17, |Δv22|/|Δv23|=10.24 and |Δn23|= 0.316.

The aspherical surface is applied onto the surfaces R11 and R16. The aspherical surface of the surface R11 effectively utilizes the facts that the off-axial ray passes only in the vicinity of the wide angle end among the entire zooming range and the height of incidence thereof is significantly different from the height of incidence of the axial ray at the telephoto side and that the off-axial ray passes only in the vicinity of the wide angle end among the entire zooming range and the height of incidence thereof is significantly different from the height of incidence of the off-axial ray of the maximum image angle in the vicinity of the zoom position corresponding to the zoom ratio $Z^{1/4}$, and has the conditions hw/ht 1.518 and hw/hz=1.538. The other aspherical surface is applied to R16 in the variator, in order to set a suitable F-drop at the telephoto side thereby utilizing the variation of the height of incidence of the axial ray in the variator at the telephoto side for correcting the aberrations.

Both aspherical surfaces are so shaped that the positive refractive power becomes stronger with the increase of the distance from the optical axis, and utilize the aspherical coefficients B, C, D and E in order to efficiently correct the distortion aberration and the spherical aberration up to the high-order region. The amount of asphericity is 210 and 215 μm in the maximum height of the incoming ray, respectively in the surfaces R11 and R16.

FIGS. 10A to 10C to FIGS. 14A to 14C show the spherical aberration, astigmatism and distortion aberration in the different zoom positions.

The zoom lens of the embodiment 3 shown in FIG. 3 has a zoom ratio of 12 and an image angle 2ω at the wide angle end exceeding 62°. R1 to R10 constitute the front lens unit F (first lens unit) having a positive refractive power for focusing. R11 to R19 constitute the variator V (second lens unit) which monotonously moves toward the image plane, for zooming from the wide angle end to the telephoto end. R20 to R22 constitute the compensator C (third lens unit) for correcting the image point associated with the zooming, having a negative refractive power and effecting a movement with a trajectory convex to the object side, in the zooming operation from the wide angle end to the telephoto end. SP (R23) indicates the stop. R24 to R40 constitute the fixed relay unit R (fourth lens unit) having the imaging function, and R41 to R43 represent a glass block equivalent to a color separation prism.

The zoom lens of the embodiment 3 has a large aperture of Fno.1=0.92, wherein the F-number Fno.1 is defined by Fno.1=fl/(ft/Fno.t) as the index of the large aperture and has the F-drop as little as about 5%. For attaining such large aperture, the front lens unit is composed of five lenses which are concave, convex, convex, convex and convex in order from the object side wherein the concave lens serves to diverge the spherical aberration thereby suppressing the generation of the spherical aberration in the front lens unit.

The lateral magnification β2w of the variator V at the wide angle end is selected somewhat larger as −0.430 in consideration of the zoom ratio of 12. The variator V is composed, in order from the object side, of a lens V1 of a negative refractive power, consisting of a single negative lens having a strongly concave surface toward the image plane and having an aspherical surface in one of the surfaces, a lens V2 of a negative refractive power consisting of a positive lens and a negative lens, and a lens V3 of a positive refractive power consisting of a positive lens and a negative lens, thereby suppressing the generation of the distortion aberration, spherical aberration and coma aberration in the variator. The aforementioned conditions are selected as f21/f2=1.35, |Δv22|/|Δv23|=3.71 and |Δn23|= 0.176.

The aspherical surface is applied to the surfaces R9 and R11. The aspherical surface of the surface R11 effectively utilizes the facts that the off-axial ray passes only in the vicinity of the wide angle end among the entire zooming range and the height of incidence thereof is significantly different from the height of incidence of the axial ray at the telephoto side and that the off-axial ray passes only in the vicinity of the wide angle end among the entire zooming range and the height of incidence thereof is significantly different from the height of incidence of the off-axial ray of the maximum image angle in the vicinity of the zoom position corresponding to the zoom ratio $Z^{1/4}$, and has the conditions hw/ht=1.337 and hw/hz=1.466. The other aspherical surface is applied to R9 in the front lens unit, in order to correct the spherical aberration in the vicinity of the telephoto end, in consideration of the facts that the correction of aberrations in the front lens unit is difficult because of the small F-number thereof and that the variation in the height of incidence of the axial ray in the variator at the telephoto side is difficult to utilize because the F-drop is merely as small as about 5%. The aspherical surface R9 is so shaped that the positive refractive power becomes weaker with the increase of the distance from the optical axis, while the aspherical surface R11 is so shaped that the positive refractive power becomes stronger with the increase of the distance from the optical axis, and there are utilized the aspherical coefficients B, C, D and E in order to efficiently correct the distortion aberration and the spherical aberration up to the high-order region. The amount of asphericity is 179 and 656 μm in the maximum height of the incoming ray, respectively in the surfaces R9 and R11.

FIGS. 15A to 15C to FIGS. 19A to 19C show the spherical aberration, astigmatism and distortion aberration in the different zoom positions.

Figure 4:
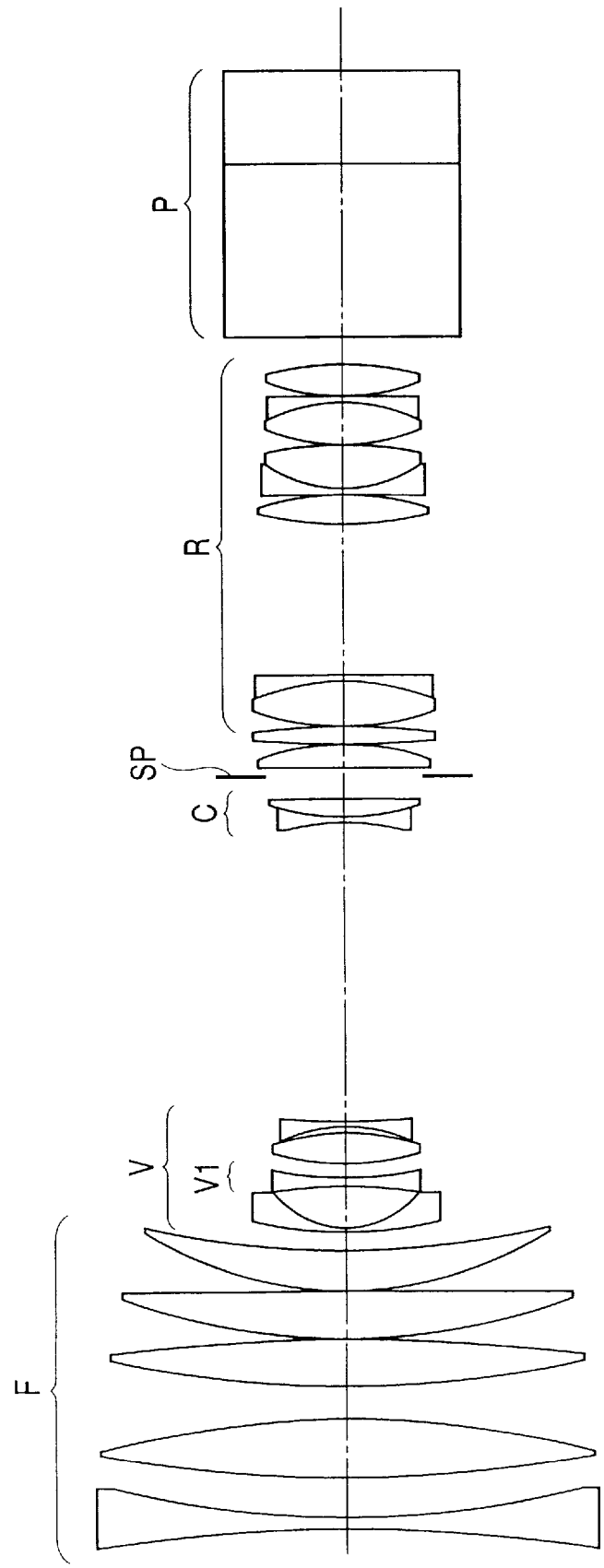
FIG. 4 is a cross-sectional view of a lens of a numerical example 4 of the present invention at the wide angle end.
Figures 14A, 14B, 14C:
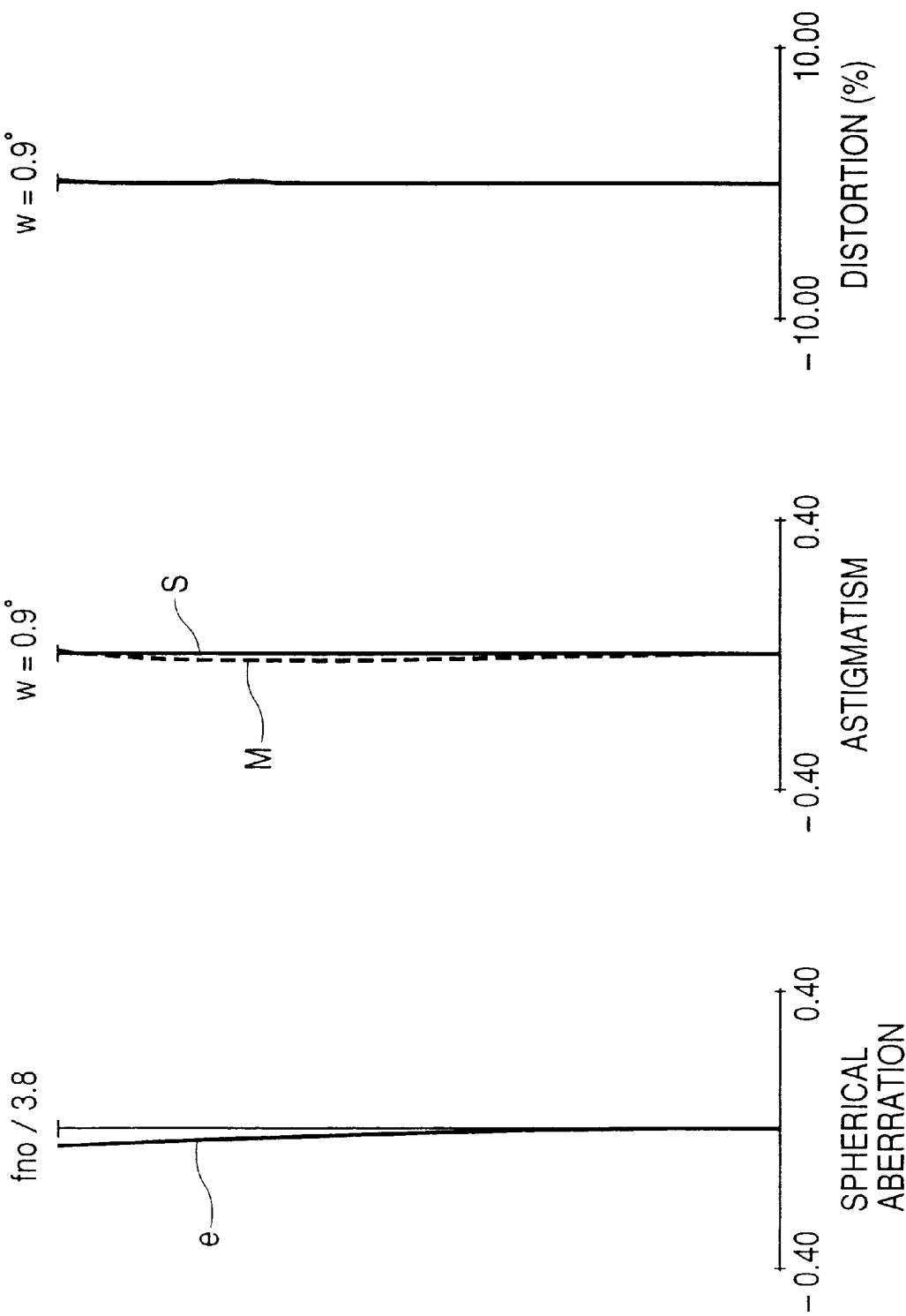
FIGS. 14A, 14B and 14C are aberration charts of an embodiment 2 of the present invention at a focal length f=350.0.
Figures 23A, 23B, 23C:
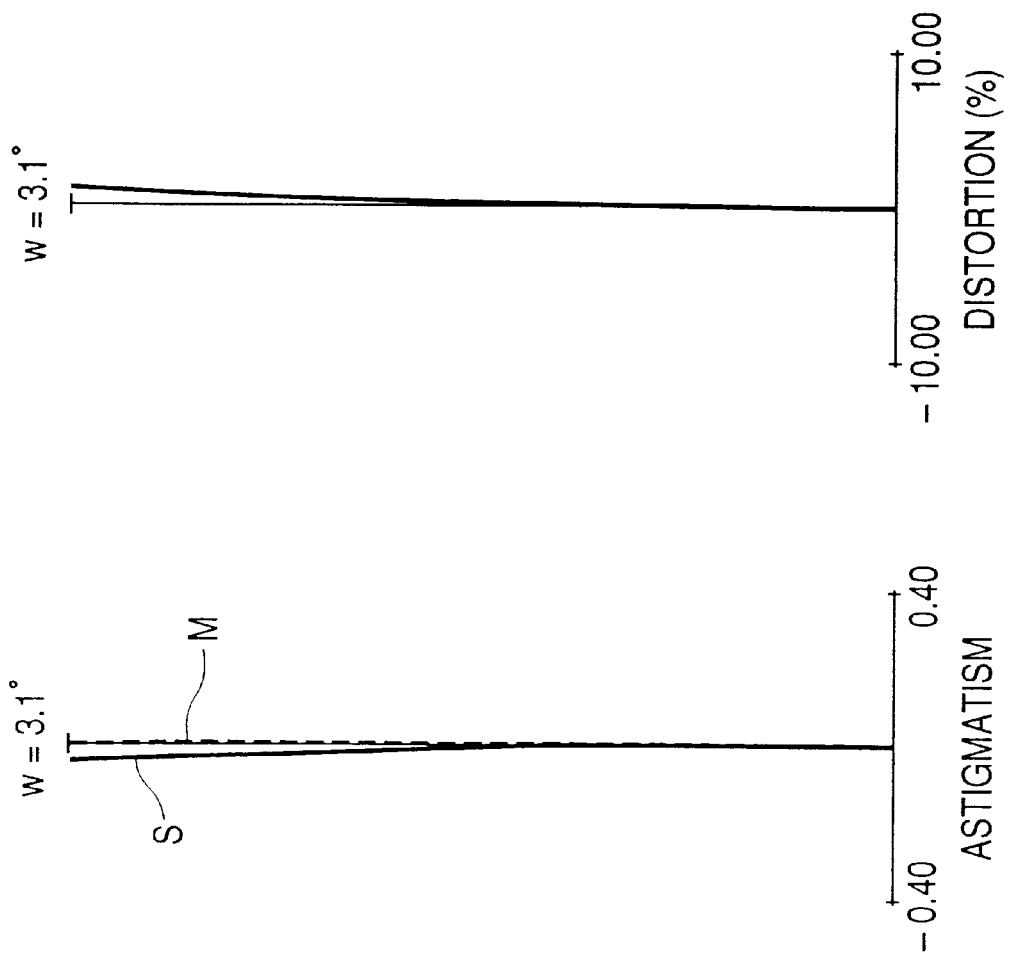
FIGS. 23A, 23B and 23C are aberration charts of an embodiment 4 of the present invention at a focal length f=102.0.
Figure 25:
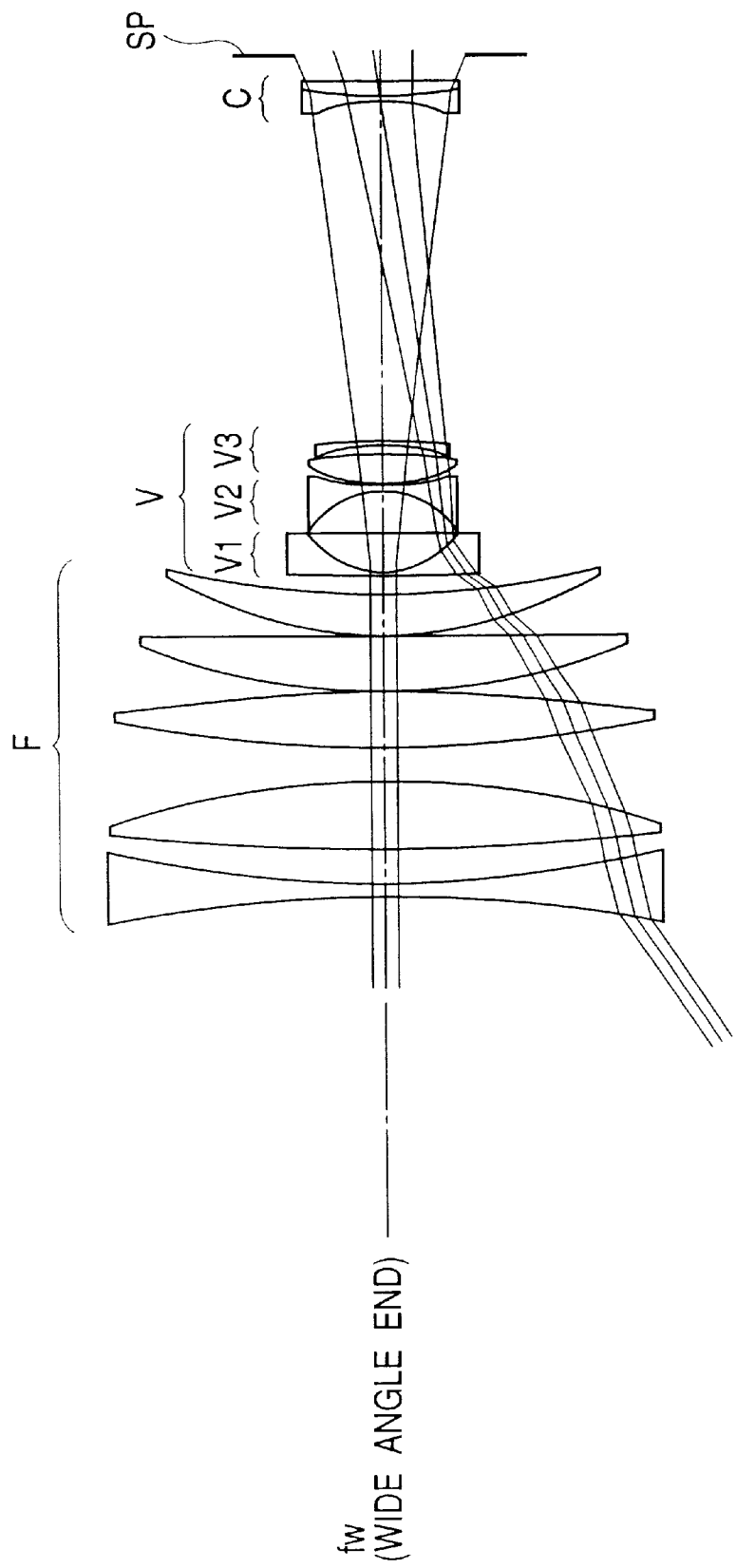
FIGS. 25 to 28 are views showing a part of the optical paths of the lens shown in FIG. 1.
Figure 26:
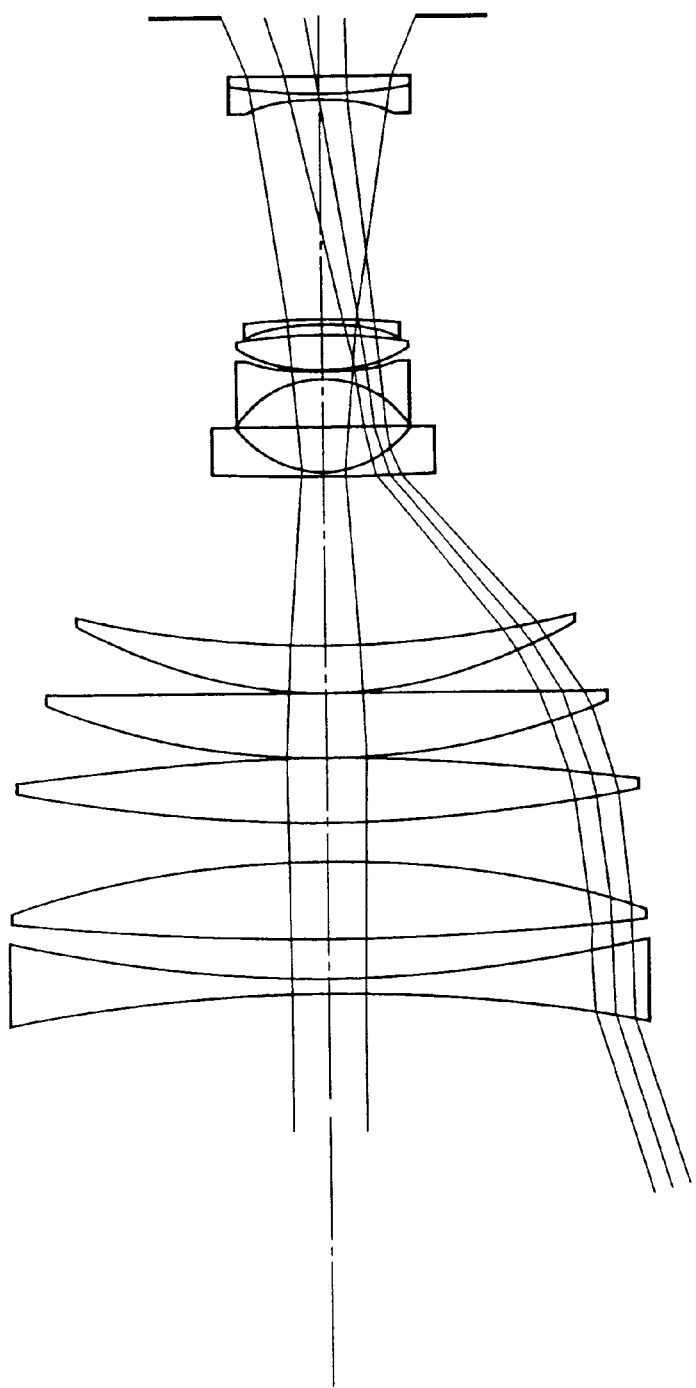
Figure 27:
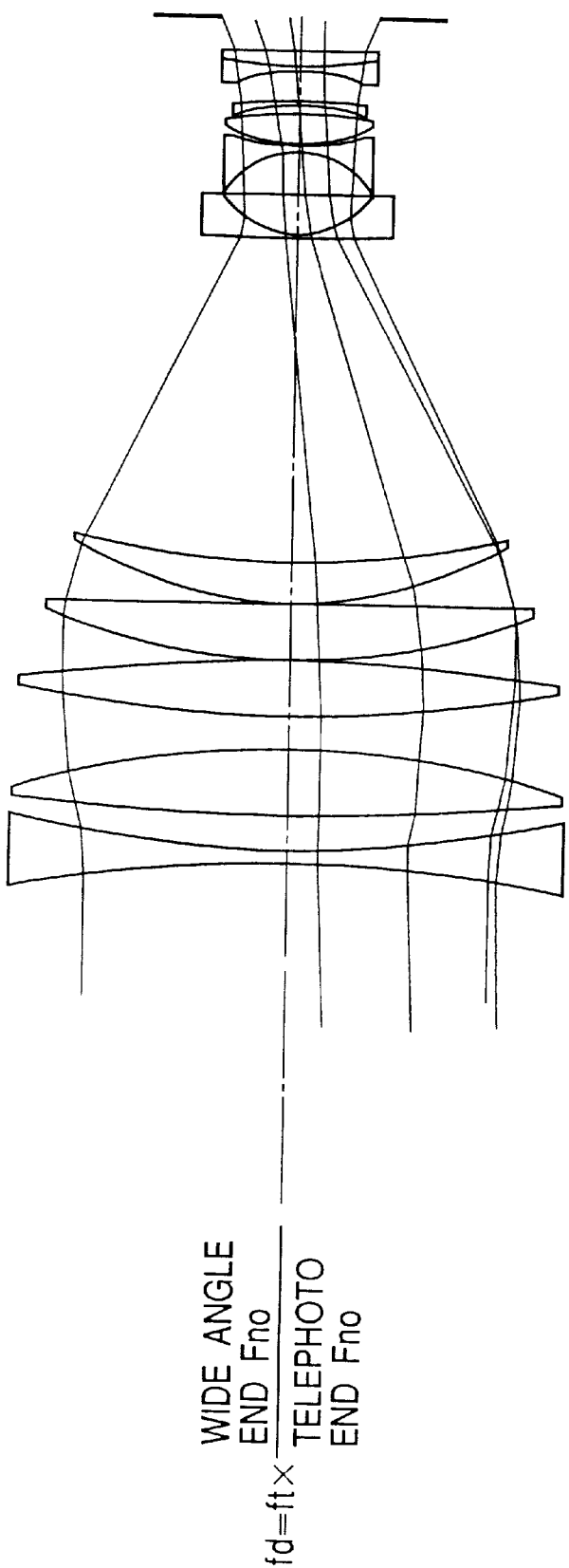
Figure 28:
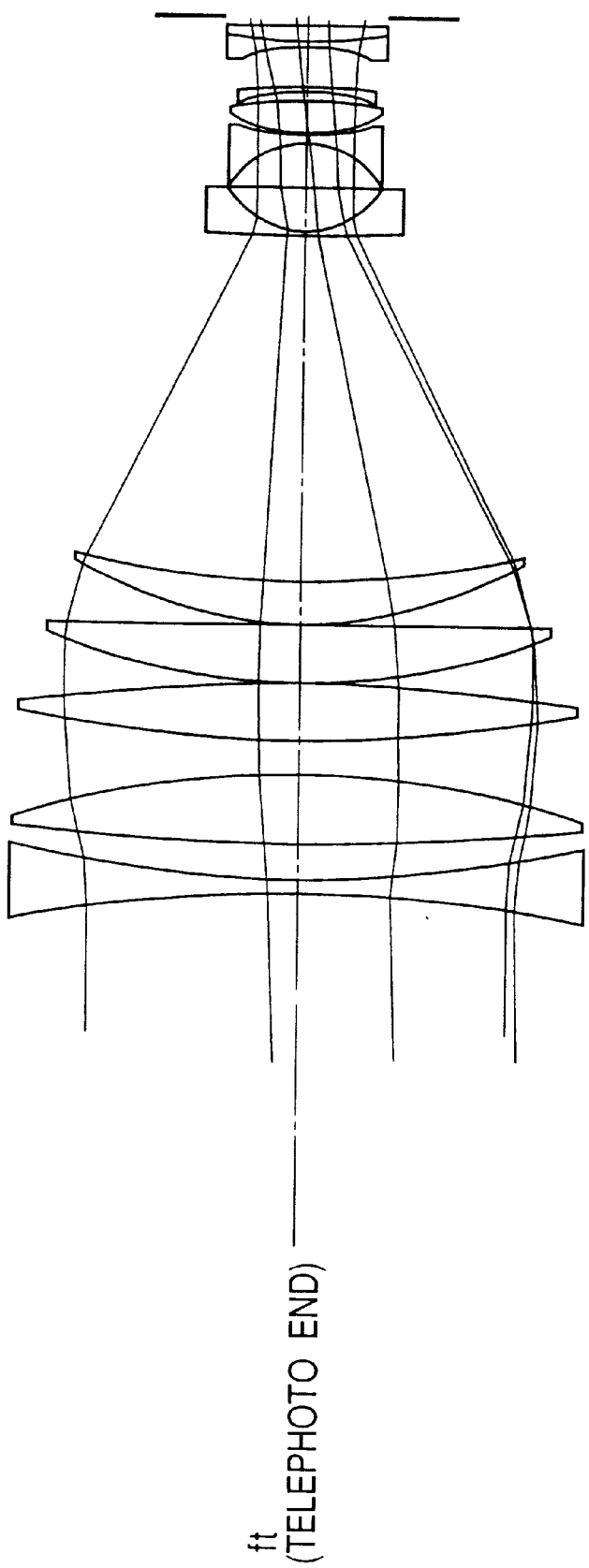

The zoom lens of the embodiment 4 shown in FIG. 4 has a zoom ratio of 15 and an image angle 2ω at the wide angle end exceeding 65°. R1 to R10 constitute the front lens unit F (first lens unit) having a positive refractive power for focusing. R11 to R18 constitute the variator V (second lens unit) which monotonously moves toward the image plane, for zooming from the wide angle end to the telephoto end. R19 to R21 constitute the compensator C (third lens unit) for correcting the image point associated with the zooming, having a negative refractive power and effecting a movement with a trajectory convex to the object side, in the zooming operation from the wide angle end to the telephoto end. SP (R22) indicates the stop. R23 to R39 constitute the fixed relay unit R (fourth lens unit) having the imaging function, and R40 to R42 represent a glass block equivalent to a color separation prism.

The zoom lens of the embodiment 4 has a large aperture of Fno.1=1.10, wherein the F-number Fno.1 is defined by Fno.1 fl/(ft/Fno.t) as the index of the large aperture. For attaining such large aperture, the front lens unit is composed of five lenses which are concave, convex, convex, convex and convex in the order from the object side wherein the concave lens serves to diverge the spherical aberration thereby suppressing the generation of the spherical aberration in the front lens unit.

The lateral magnification β2w of the variator V at the wide angle end is selected somewhat larger as −0.291 in consideration of the zoom ratio of 15. The variator V is composed, in order from the object side, of a lens V1 of a negative refractive power, consisting of a meniscus negative lens having a strongly concave surface toward the image plane and a biconcave negative lens having an aspherical surface in one of the surfaces, a positive lens and a negative lens, thereby suppressing the generation of the distortion aberration, spherical aberration and coma aberration in the variator while achieving further compactization and cost reduction. The aforementioned condition is as selected as f21/f2=1.57.

The aspherical surface is applied to the surfaces R9 and R13. The aspherical surface of the surface R13 effectively utilizes the facts that the off-axial ray passes only in the vicinity of the wide angle end among the entire zooming range and the height of incidence thereof is significantly different from the height of incidence of the axial ray at the telephoto side and that the off-axial ray passes only in the vicinity of the wide angle end among the entire zooming range and the height of incidence thereof is significantly different from the height of incidence of the off-axial ray of the maximum image angle in the vicinity of the zoom position corresponding to the zoom ratio $Z^{1/4}$, and has the conditions hw/ht=1.322 and hw/hz=1.394. The other aspherical surface is applied to R9 in the front lens unit, in order to correct the spherical aberration in the vicinity of the telephoto end, in consideration of a fact that the correction of aberrations in the front lens unit is difficult because of the small F-number thereof. The aspherical surface R9 is so shaped that the positive refractive power becomes weaker with the increase of the distance from the optical axis, while the aspherical surface R13 is so shaped that the negative refractive power becomes weaker with the increase of the distance from the optical axis, wherein the aspherical coefficient D is used. The amount of asphericity is 68 and 28 $\mu$m in the maximum height of the incoming ray, respectively in the surfaces R9 and R13.

FIGS. 20A to 20C to FIGS. 24A to 24C show the spherical aberration, astigmatism and distortion aberration in the different zoom positions.

In the following there are shown numerical examples of the present invention, wherein $r_i$ indicates the radius of curvature of an i-th lens surface; $d_i$ is the thickness of an i-th lens or air gap from the object side; $n_i$ and $v_i$ are respectively the refractive index and the Abbe's number of the material constituting an i-th lens from the object side.

The aspherical shape is represented by the following formula:

$$X = \frac{H^2/R}{1 + \sqrt{1 - (1+k)(H/R)^2}} + BH^4 + CH^6 + DH^8 + EH^{10}$$

wherein X-axis is taken in the direction of the optical axis; H-axis is taken perpendicular thereto; the proceeding direction of light is taken as positive; R is the paraxial radius of curvature; and k, B, C, D and E are aspherical coefficients.

[Numerical example 1]

| | | f = 8.0 to 160.0 | fno = 1.8 to 2.5 | 2w = 69° to 3.9° | |
|---|---|---|---|---|---|
| | r 1 = | −209.135 | d 1 = | 2.00 n 1 = 1.81265 | v 1 = 25.4 |
| | r 2 = | 197.530 | d 2 = | 5.48 | |
| | r 3 = | 428.796 | d 3 = | 10.15 n 2 = 1.43985 | v 2 = 95.0 |
| | r 4 = | −135.200 | d 4 = | 7.18 | |
| | r 5 = | 201.248 | d 5 = | 8.51 n 3 = 1.49845 | v 3 = 81.5 |
| | r 6 = | −277.953 | d 6 = | 0.20 | v 4 = 60.3 |
| | r 7 = | 98.823 | d 7 = | 8.49 n 4 = 1.62286 | |
| | r 8 = | 2720.590 | d 8 = | 0.20 | v 5 = 60.3 |
| | r 9 = | 60.166 | d 9 = | 6.49 n 5 = 1.62286 | |
| | r10 = | 121.266 | d10 = variable | | v 6 = 40.8 |
| aspherical | r11 = | 711.582 | d11 = | 0.80 n 6 = 1.88815 | |
| | r12 = | 15.170 | d12 = | 5.49 | v 7 = 25.4 |
| | r13 = | −809.880 | d13 = | 7.21 n 7 = 1.81264 | v 8 = 49.6 |
| | r14 = | −13.834 | d14 = | 0.80 n 8 = 1.77621 | v 9 = 42.8 |
| | r15 = | 42.401 | d15 = | 0.20 | |
| aspherical | r16 = | 32.808 | d16 = | 4.87 n 9 = 1.57047 | v10 = 40.8 |
| | r17 = | 45.854 | d17 = | 1.31 | |
| | r18 = | −22.459 | d18 = | 0.80 n10 = 1.88815 | v11 = 46.6 |
| | r19 = | 52.494 | d19 = variable | | v12 = 21.3 |
| | r20 = | −29.824 | d20 = | 0.80 n11 = 1.82017 | |
| | r21 = | 72.483 | d21 = | 2.31 n12 = 1.93306 | |
| | r22 = | −262.925 | d22 = variable | | v13 = 60.3 |
| | r23 = | stop | d23 = | 1.30 | v14 = 58.9 |
| | r24 = | 912.463 | d24 = | 3.93 n13 = 1.62286 | |
| | r25 = | −43.816 | d25 = | 0.15 | v15 = 58.9 |
| | r26 = | 118.108 | d26 = | 3.42 n14 = 1.52033 | v16 = 44.2 |
| | r27 = | −90.208 | d27 = | 0.15 | |
| | r28 = | 58.769 | d28 = | 6.50 n15 = 1.52033 | v17 = 64.1 |
| | r29 = | −38.276 | d29 = | 1.15 n16 = 1.79012 | |
| | r30 = | 359.890 | d30 = | 34.00 | v18 = 42.2 |
| | r31 = | 63.086 | d31 = | 5.50 n17 = 1.51825 | v19 = 59.0 |
| | r32 = | 47.504 | d32 = | 2.33 | v20 = 70.2 |
| | r33 = | −67.885 | d33 = | 1.15 n18 = 1.80401 | v21 = 40.9 |
| | r34 = | 25.622 | d34 = | 6.23 n19 = 1.52032 | |

-continued

| f = 8.0 to 160.0 | fno = 1.8 to 2.5 | 2w = 69° to 3.9° | | |
|---|---|---|---|---|
| r35 = −134.526 | d35 = | 0.15 | | ν22 = 59.0 |
| r36 = 72.667 | d36 = | 6.82 n20 = 1.48915 | | |
| r37 = −26.202 | d37 = | 1.15 n21 = 1.81078 | | ν23 = 38.0 |
| r38 = −111.229 | d38 = | 0.15 | | ν24 = 64.2 |
| r39 = 47.231 | d39 = | 5.74 n22 = 1.52032 | | |
| r40 = −5&068 | d40 = | 4.50 | | |
| r41 = ∞ | d41 = | 30.00 n23 = 1.60718 | | |
| r42 = ∞ | d42 = | 16.20 n24 = 1.51825 | | |
| r43 = ∞ | | | | |

TABLE 1

| variable | focal length | | | | |
|---|---|---|---|---|---|
| distance | 8.00 | 16.92 | 48.00 | 115.20 | 160.00 |
| d 10 | 1.24 | 23.55 | 42.00 | 50.37 | 52.22 |
| d 19 | 53.87 | 27.99 | 6.98 | 3.91 | 6.65 |
| d 22 | 4.50 | 8.08 | 10.63 | 5.34 | 0.74 |

Aspherical shape
Surface R11
Reference spherical surface R = 711.582
Aspherical coefficients $k = 1.175 \times D^3$
$B = 8.321 \times D^{-5}$
$C = -8.121 \times D^{-9}$
$D = -2.063 \times D^{-11}$
$E = 3.227 \times D^{-14}$ TABLE 1-continued Aspherical amount (R11)

| h | Δ |
|---|---|
| 70% (10.16mm) | 82.8μm |
| 90% (13.07mm) | 204.3μm |
| 100% (14.52mm) | 290.9μm |

$|\Delta 10/f2| = 2.155 \times 10^{-2}$
$|\Delta 9/f2| = 1.513 \times 10^{-2}$
$|\Delta 7/f2| = 6.130 \times 10^{-3}$ Surface R16
Reference spherical surface R = 32.808

Aspherical coefficients | Zoom parameter
---|---
$k = 3.003 \times D^{-1}$ | fno.1 = 1.09
$B = 1.321 \times D^{-5}$ | β2w = −0.255
$C = 2.226 \times D^{-8}$ | hw/ht = 1.412
$D = -1.237 \times D^{-10}$ | hw/hz = 1.602
$E = 1.820 \times D^{-12}$ | f21/f2 = 1.29
 | $|\Delta\nu 22| / |\Delta\nu 231| = 11.68$
 | Δn23 = 0.316

[Numerical example 2]

| f = 10.0 to 350.0 | | fno = 2.0 to 3.8 | 2w = 57.6° to 1.8° | | |
|---|---|---|---|---|---|
| | r 1 = −1551.086 | d 1 = | 2.50 n1 = 1.72311 | ν 1 = 29.5 |
| | r 2 = 243.004 | d 2 = | 4.84 | |
| | r 3 = 817.493 | d 3 = | 7.29 n 2 = 1.43985 | ν 2 = 95.0 |
| | r 4 = −351.281 | d 4 = | 10.48 | |
| | r 5 = 204.382 | d 5 = | 10.64 n 3 = 1.43985 | ν 3 = 95.0 |
| | r 6 = −547.737 | d 6 = | 0.25 | ν 4 = 81.5 |
| | r 7 = 141.755 | d 7 = | 8.38 n 4 = 1.49845 | |
| | r 8 = 626.139 | d 8 = | 0.25 | ν 5 = 70.2 |
| | r 9 = 107.150 | d 9 = | 8.04 n 5 = 1.48915 | |
| | r10 = 256.888 | d10 = variable | | ν 6 = 46.6 |
| aspherical | r11 = ∞ | d11 = | 1.00 n 6 = 1.82017 | |
| | r12 = 19.187 | d12 = | 6.87 | ν 7 = 25.4 |
| | r13 = −81.049 | d13 = | 6.58 n 7 = 1.81264 | ν 8 = 46.6 |
| | r14 = −17.529 | d14 = | 1.00 n 8 = 1.82017 | ν 9 = 42.8 |
| | r15 = −442.122 | d15 = | 0.25 | ν10 = 40.8 |
| aspherical | r16 = 52.972 | d16 = | 7.73 n 9 = 1.57047 | |
| | r17 = −22.794 | d17 = | 1.00 n10 = 1.88815 | ν11 = 42.2 |
| | r18 = −142.437 | d18 = variable | | ν12 = 21.3 |
| | r19 = −43.748 | d19 = | 1.00 n11 = 1.80401 | |
| | r20 = 60.119 | d20 = | 3.73 n12 = 1.93306 | |
| | r21 = 2127.464 | d21 = variable | | ν13 = 60.3 |
| | r22 = stop | d22 = | 1.30 | ν14 = 58.9 |
| | r23 = −10071.957 | d23 = | 5.02 n13 = 1.62286 | |
| | r24 = −52.527 | d24 = | 0.20 | ν15 = 70.2 |
| | r25 = 140.974 | d25 = | 3.91 n14 = 1.52033 | ν16 = 37.2 |
| | r26 = −157.806 | d26 = | 0.20 | |
| | r27 = 43.266 | d27 = | 9.30 n15 = 1.48915 | ν17 = 58.9 |
| | r28 = −63.465 | d28 = | 1.50 n16 = 1.83932 | ν18 = 42.2 |
| | r29 = 112.736 | d29 = | 42.50 | ν19 = 59.0 |
| | r30 = 120.958 | d30 = | 5.87 n17 = 1.52033 | |
| | r31 = −67.714 | d31 = | 0.62 | ν20 = 70.2 |
| | r32 = 108.334 | d32 = | 1.50 n18 = 1.80401 | ν21 = 44.2 |
| | r33 = 32.388 | d33 = | 6.72 n19 = 1.52032 | |
| | r34 = 1263.816 | d34 = | 0.82 | ν22 = 58.9 |
| | r35 = 31.886 | d35 = | 8.03 n20 = 1.48915 | ν23 = 38.0 |
| | r36 = −60.905 | d36 = | 1.50 n21 = 1.79012 | ν24 = 64.2 |

-continued

| | f = 10.0 to 350.0 | fno = 2.0 to 3.8 | 2w = 57.6° to 1.8° |
|---|---|---|---|
| r37 = | 123.142 | d37 = | 2.41 |
| r38 = | −1081.305 | d38 = | 1.72 n22 = 1.52033 |
| r39 = | 469.337 | d39 = | 5.50 |
| r40 = | ∞ | d40 = | 37.50 n23 = 1.60718 |
| r41 = | ∞ | d41 = | 20.25 n24 = 1.51825 |
| r42 = | ∞ | | |

TABLE 2

| variable | focal length | | | | |
|---|---|---|---|---|---|
| distance | 10.00 | 24.32 | 60.00 | 184.00 | 350.00 |
| d 10 | 3.61 | 53.65 | 84.12 | 104.93 | 111.04 |
| d 18 | 114.92 | 59.40 | 24.16 | 5.99 | 10.57 |
| d 21 | 4.00 | 9.49 | 14.26 | 11.61 | 0.92 |

Aspherical shape
Surface R11
Reference spherical surface R = 0(∞)
Aspherical coefficients $k = 1.286 \times D^{32}$
$B = 5.469 \times D^{-5}$
$C = -1.477 \times D^{-8}$
$D = 6.491 \times D^{-11}$
$E = -1.311 \times D^{-13}$ TABLE 2-continued Aspherical amount (R11)

| | h | Δ |
|---|---|---|
| 70% | (10.67mm) | 54.7μm |
| 90% | (13.72mm) | 145.6μm |
| 100% | (15.42mm) | 210.2μm |

$|\Delta 10/f2| = 1.051 \times 10^{-2}$
$|\Delta 9/f2| = 7.280 \times 10^{-2}$
$|\Delta 7/f2| = 2.870 \times 10^{-2}$ Surface R16
Reference spherical surface R = 52.972

| Aspherical coefficients | Zoom parameter |
|---|---|
| $k = -3.451 \times D^0$ | Fno.1 = 1.52 |
| $B = 8.108 \times D^{-5}$ | β2w = −0.180 |
| $C = 1.963 \times D^{-8}$ | hw/ht = 1.518 |
| $D = -9.430 \times D^{-11}$ | hw/hz = 1.538 |
| $E = 3.744 \times D^{-13}$ | f21/f2 = 1.17 |
| | $|\Delta v22| / |\Delta v23| = 10.24$ |
| | Δn23 = 0.316 |

[Numerical example 3]

| | | f = 9.0 to 108.0 | fno = 1.7 to 1.8 | 2w = 62.9° to 5.8° | | |
|---|---|---|---|---|---|---|
| | r 1 = | −131.513 | d 1 = | 2.30 n 1 = 1.81265 | ν 1 = | 25.4 |
| | r 2 = | 189.208 | d 2 = | 5.26 | | |
| | r 3 = | 238.300 | d 3 = | 10.13 n 2 = 1.49845 | ν 2 = | 81.5 |
| | r 4 = | −122.634 | d 4 = | 5.16 | | |
| | r 5 = | 145.779 | d 5 = | 8.36 n 3 = 1.49845 | ν 3 = | 81.5 |
| | r 6 = | −272.315 | d 6 = | 0.20 | | |
| | r 7 = | 93.682 | d 7 = | 7.23 n 4 = 1.62286 | ν 4 = | 60.3 |
| | r 8 = | 1024.330 | d 8 = | 0.20 | ν 5 = | 60.3 |
| | r 9 = | 50.464 | d 9 = | 8.24 n 5 = 1.62286 | | |
| | r10 = | 137.487 | d10 = | variable | ν 6 = | 40.8 |
| aspherical | r11 = | 267.214 | d11 = | 0.80 n 6 = 1.88815 | | |
| | r12 = | 16.192 | d12 = | 6.62 | ν 7 = | 25.4 |
| | r13 = | −952.679 | d13 = | 7.37 n 7 = 1.81264 | ν 8 = | 49.6 |
| | r14 = | −16.326 | d14 = | 0.80 n 8 = 1.77621 | ν 9 = | 42.8 |
| | r15 = | 25.436 | d15 = | 0.20 | | |
| aspherical | r16 = | 20.652 | d16 = | 5.94 n 9 = 1.57047 | ν10 = | 49.3 |
| | r17 = | −64.000 | d17 = | 1.51 | | |
| | r18 = | −24.306 | d18 = | 0.80 n10 = 1.74678 | ν11 = | 49.6 |
| | r19 = | −56.287 | d19 = | variable | ν12 = | 23.9 |
| | r20 = | −27.791 | d20 = | 0.80 n11 = 1.77621 | | |
| | r21 = | 80.651 | d21 = | 228 n12 = 1.85501 | | |
| | r22 = | −189.480 | d22 = | variable | ν13 = | 70.2 |
| | r23 = | stop | d23 = | 1.40 | ν14 = | 33.8 |
| | r24 = | 290.546 | d24 = | 3.01 n13 = 1.48915 | | |
| | r25 = | −69.924 | d25 = | 0.20 | ν15 = | 52.4 |
| | r26 = | 79.392 | d26 = | 2.97 n14 = 1.65223 | ν16 = | 54.7 |
| | r27 = | −175.422 | d27 = | 0.20 | | |
| | r28 = | 65.760 | d28 = | 5.92 n15 = 1.51976 | ν17 = | 70.2 |
| | r29 = | −33.110 | d29 = | 1.30 n16 = 1.73234 | ν18 = | 37.2 |
| | r30 = | −1650.625 | d30 = | 25.00 | ν19 = | 70.2 |
| | r31 = | −25.124 | d31 = | 2.15 n17 = 1.48915 | | |
| | r32 = | −24.352 | d32 = | 4.96 | ν20 = | 70.2 |
| | r33 = | 83.876 | d33 = | 1.50 n18 = 1.83932 | ν21 = | 25.4 |
| | r34 = | 29.672 | d34 = | 6.13 n19 = 1.48915 | | |
| | r35 = | −82.941 | d35 = | 0.20 | ν22 = | 70.2 |
| | r36 = | 60.180 | d36 = | 5.58 n20 = 1.48915 | ν23 = | 38.0 |
| | r37 = | −39.765 | d37 = | 1.50 n21 = 1.81265 | ν24 = | 64.2 |
| | r38 = | −303.256 | d38 = | 0.20 | | |
| | r39 = | 33.006 | d39 = | 4.70 n22 = 1.48915 | | |

-continued

| | f = 9.0 to 108.0 | fno = 1.7 to 1.8 | 2w = 62.9° to 5.8° |
|---|---|---|---|
| r40 = | −380.150 | d40 = | 4.00 |
| r41 = | ∞ | d41 = | 30.00 n23 = 1.60718 |
| r42 = | ∞ | d42 = | 16.20 n24 = 1.51825 |
| r43 = | ∞ | | |

TABLE 3

| variable distance | focal length | | | | |
|---|---|---|---|---|---|
| | 9.00 | 16.75 | 36.00 | 72.00 | 108.00 |
| d 10 | 0.99 | 15.09 | 26.42 | 32.53 | 34.66 |
| d 19 | 37.45 | 21.41 | 10.39 | 9.53 | 13.21 |
| d 22 | 10.00 | 11.94 | 11.63 | 6.38 | 0.57 |

Aspherical shape
Surface R9
Reference spherical surface R = 50.464
Aspherical coefficients
$k = -7.890 \times D^{-6}$
$B = -1.194 \times D^{-7}$
$C = -3.339 \times D^{-11}$
$D = -3.519 \times D^{-14}$
$E = -9.787 \times D^{-18}$

TABLE 3-continued

Aspherical amount (R11)

| | h | Δ |
|---|---|---|
| 70% | (11.13mm) | 239.6μm |
| 90% | (14.31mm) | 485.6μm |
| 100% | (15.90mm) | 656.0μm |

$|\Delta 10/f2| = 4.370 \times 10^{-2}$
$|\Delta\ 9/f2| = 3.238 \times 10^{-2}$
$|\Delta\ 7/f2| = 1.597 \times 10^{-3}$
Surface R11
Reference spherical surface R = 267.214

| Aspherical coefficients | Zoom parameter |
|---|---|
| $k = 1.060 \times D^{-3}$ | Fno.1 = 0.917 |
| $B = 8.366 \times D^{-5}$ | β2w = −0.430 |
| $C = -1.265 \times D^{-8}$ | hw/ht = 1.337 |
| $D = 1.847 \times D^{-11}$ | hw/hz = 1.466 |
| $E = -1.744 \times D^{-14}$ | f21/f2 = 1.35 |
| | $|\Delta\nu 22| / |\Delta\nu 231| = 3.71$ |
| | Δn23 = 0.176 |

[Numerical example 4]

| | f = 8.5 to 127.5 | fno = 1.6 to 2.0 | 2w = 65.8° to 4.9° | |
|---|---|---|---|---|
| | r 1 = −229.113 | d 1 = | 2.00 n 1 = 1.81265 | ν 1 = 25.4 |
| | r 2 = 159.491 | d 2 = | 6.94 | |
| | r 3 = 219.260 | d 3 = | 9.83 n 2 = 1.43985 | ν 2 = 95.0i |
| | r 4 = −181.170 | d 4 = | 7.33 | |
| | r 5 = 169.635 | d 5 = | 8.51 n 3 = 1.49845 | ν 3 = 81.5 |
| | r 6 = −322717 | d 6 = | 0.20 | |
| | r 7 = 113.335 | d 7 = | 8.18 n 4 = 1.62286 | ν 4 = 60.3 |
| | r 8 = −1254.113 | d 8 = | 0.20 | ν 5 = 60.3 |
| | r 9 = 61.427 | d 9 = | 6.66 n 5 = 1.62286 | |
| | r10 = 128.800 | d10 = variable | | ν 6 = 42.7 |
| aspherical | r11 = 45.711 | d11 = | 0.80 n 6 = 1.83945 | |
| | r12 = 16.310 | d12 = | 7.96 | ν 7 = 42.7 |
| | r13 = −50.819 | d13 = | 0.80 n 7 = 1.81264 | |
| | r14 = 35.851 | d14 = | 2.53 | ν 8 = 23.9 |
| | r15 = 28.064 | d15 = | 5.77 n 8 = 1.85501 | ν 9 = 54.7 |
| aspherical | r16 = −47.799 | d16 = | 1.05 | |
| | r17 = −28.343 | d17 = | 0.80 n 9 = 1.73234 | ν10 = 49.6 |
| | r18 = 76.427 | d18 = variable | | ν11 = 23.9 |
| | r19 = −28.166 | d19 = | 0.80 n10 = 1.77621 | |
| | r20 = 39.757 | d20 = | 3.03 n11 = 1.85501 | |
| | r21 = −1635.084 | d21 = variable | | ν12 = 60.3 |
| | r22 = stop | d22 = | 2.00 | |
| | r23 = 1415.585 | d23 = | 4.65 n12 = 1.62286 | ν13 = 52.4 |
| | r24 = −38.108 | d24 = | 0.15 | ν14 = 52.4 |
| | r25 = 102.609 | d25 = | 3.75 n13 = 1.51976 | ν15 = 44.2 |
| | r26 = −101.335 | d26 = | 0.15 | |
| | r27 = 43.875 | d27 = | 8.13 n14 = 1.51976 | ν16 = 64.1 |
| | r28 = −35.460 | d28 = | 1.15 n15 = 1.79012 | |
| | r29 = 127.261 | d29 = | 25.00 | ν17 = 42.7 |
| | r30 = 83.834 | d30 = | 5.45 n16 = 1.51825 | ν18 = 56.4 |
| | r31 = −47.610 | d31 = | 0.15 | ν19 = 70.2 |
| | r32 = −293.743 | d32 = | 1.15 n17 = 1.83945 | ν20 = 37.2 |
| | r33 = 22.534 | d33 = | 7.49 n18 = 1.50349 | |
| | r34 = −116.717 | d34 = | 0.15 | ν21 = 70.2 |
| | r35 = 43.274 | d35 = | 7.47 n19 = 1.48915 | |
| | r36 = −27.718 | d36 = | 1.15 n20 = 1.83932 | ν22 = 38.0 |
| | r37 = 1818.023 | d37 = | 0.15 | ν23 = 64.2 |
| | r38 = 47.956 | d38 = | 6.17 n21 = 1.48915 | |
| | r39 = −40.583 | d39 = | 4.50 | |

-continued f = 8.5 to 127.5  fno = 1.6 to 2.0  2w = 65.8° to 4.9°

| | | | | |
|---|---|---|---|---|
| r40 = | ∞ | d40 = | 30.00 | n22 = 1.60718 |
| r41 = | ∞ | d41 = | 16.20 | n23 = 1.51825 |
| r42 = | ∞ | d42 = | | |

TABLE 4

| variable | focal length | | | | |
|---|---|---|---|---|---|
| distance | 8.50 | 16.73 | 51.00 | 102.00 | 127.50 |
| d 10 | 0.46 | 20.64 | 50.42 | 47.72 | 49.26 |
| d 18 | 52.52 | 29.74 | 8.17 | 5.43 | 6.53 |
| d 21 | 4.00 | 6.59 | 8.08 | 3.82 | 1.18 |

Aspherical shape
Surface R9
Reference spherical surface R = 61.427
Aspherical coefficients $$k = -3.578 \times D^{-2}$$
$$B = -1.627 \times D^{-8}$$
$$C = -5.321 \times D^{-12}$$
$$D = -1.087 \times D^{-15}$$
$$E = -2.958 \times D^{-18}$$

Aspherical amount (R13)

| h | | Δ |
|---|---|---|
| 70% | (8.47mm) | 1.6μm |
| 90% | (10.89mm) | 12.2μm |
| 100% | (12.10mm) | 28.4μm |

$|\Delta 10/f2| = 6.349 \times 10^{-3}$
$|\Delta 9/f2| = 4.737 \times 10^{-3}$
$|\Delta 7/f2| = 2.091 \times 10^{-3}$ Surface R13
Reference spherical surface R = −50.819

| Aspherical coefficients | Zoom parameter |
|---|---|
| $k = 0.000 \times D^0$ | Fno.1 = 1.098 |
| $B = 0.000 \times D^0$ | β2w = −0.430 |
| $C = 0.000 \times D^0$ | hw/ht = 1.322 |
| $D = 6.178 \times D^{-11}$ | hw/hz = 1.394 |
| $E = 0.000 \times D^0$ | f21/f2 = 1.662 |

As explained in the foregoing, the present invention can provide a zoom lens with a large aperture, a wide image angle and a high zoom ratio, having an F-number of about 1.7 at the wide angle end, an image angle 2ω of about 57° to 70° at the wide angle end and a zoom ratio of about (12 to 35) to 1 and showing satisfactory optical performance over the entire zooming range, by properly selecting the lateral magnification of the variator lens unit at the wide angle end, the F-number of the front lens unit and the lens arrangement of the variator lens unit in so-called 4-group zoom lens configuration, also introducing at least an aspherical surface for reducing the distortion aberration in the vicinity of the wide angle end, and introducing an aspherical surface into the front lens unit or the lens group closest to the object side in the variator lens unit for correcting the variation in the spherical aberration in the telephoto side, and correcting the variations in the astigmatism, coma aberration and chromatic aberration associated with the zooming operation.

What is claimed is:

1. A zoom lens provided, in order from an object side, with a first lens unit having a positive refractive power fixed at a zooming operation, a second lens unit having a negative refractive power for zooming, a third lens unit for correcting variation of an image plane from the zooming operation, and a fixed fourth lens unit having a positive refractive power, said zoom lens comprising:

a lens V1 including, in at least one of the lens surfaces thereof, an aspherical surface AS1 satisfying conditions 1.25<hw/ht and 1.32<hw/hz in which Z is the zoom ratio, ht is the maximum height of incidence of the axial ray among the rays passing through said second lens unit, hw is the maximum height of incidence of the off-axial ray of the maximum image angle at the wide angle end, and hz is the maximum height of incidence of the off-axial ray of the maximum image angle at a zoom position corresponding to a zoom ratio $Z^{1/4}$; and there are further satisfied the conditions:

$$1.0 < f21|f| < 1.8$$

$$1.8 \times 10^{-3} < |\Delta 10/f2| < 4.6 \times 10^{-2}$$

$$7.7 \times 10^{-4} < |\Delta 9/f2| < 3.4 \times 10^{-2}$$

$$1.0 \times 10^{-4} < |\Delta 7/f2| < 1.7 \times 10^{-2}$$

wherein f2 is the focal length of said second lens unit; f21 is the focal length of said lens V1; said aspherical surface AS1 is so shaped that the positive refractive power becomes stronger toward the peripheral part of the lens in case it is applied to a positive refractive surface or that the negative refractive power becomes weaker toward the peripheral part of the lens in case it is applied to a negative refractive surface; and Δ10, Δ9, and Δ7 respectively indicate the amount of asphericity at 100%, 90%, and 70% of the effective diameter of said aspherical surface AS1.

2. A zoom lens according to claim 1, satisfying the conditions:

$$10 < Z$$

$$0.8 < Fno.1 < 1.6$$

$$-0.45 < \beta 2w < -0.15$$

wherein ft and Fno.t are respectively the focal length and the F-number of the entire system at the telephoto end; f1 is the focal length of said first lens unit; the F-number there is defined by Fno.1=f1/(ft/Fno.t); and β2w is the lateral magnification of said second lens unit at the wide angle end; and Z is the zoom ratio.

3. A zoom lens according to claim 1, wherein said second lens unit is composed, in order from the object side, of said lens V1, a lens V2 including at least a positive lens and a negative lens and having a negative refractive power in total, and a lens V3 including at least a positive lens and a negative lens and having a positive refractive power in total.

4. A zoom lens according to claim 2, wherein said second lens unit is composed, in order from the object side, of said lens V1, a lens V2 including at least a positive lens and a negative lens and having a negative refractive power in total, and a lens V3 including at least a positive lens and a negative lens and having a positive refractive power in total.

5. A zoom lens according to claim 3, satisfying conditions:

$3.5 < |\Delta v22|/|\Delta v23|$ $0.17 < |\Delta n23|$ wherein $\Delta v22$ is the difference in Abbe's number between the positive lens and the negative lens in said lens V2, $\Delta v23$ is the difference in Abbe's number between the positive lens and the negative lens in said lens V3 and $\Delta n23$ is the difference in refractive index between the positive lens and the negative lens in said lens V3.

6. A zoom lens according to claim 4, satisfying conditions:

$3.5 < |\Delta v22|/|\Delta v23|$ $0.17 < |\Delta n23|$ wherein $\Delta v22$ is the difference in Abbe's number between the positive lens and the negative lens in said lens V2, $\Delta v23$ is the difference in Abbe's number between the positive lens and the negative lens in said lens V3 and $\Delta n23$ is the difference in refractive index between the positive lens and the negative lens in said lens V3.

* * * * *

UNITED STATES PATENT AND TRADEMARK OFFICE
CERTIFICATE OF CORRECTION

PATENT NO. : 5,995,296

DATED : November 30, 1999

INVENTOR(S) : FUMIAKI USUI

It is certified that error appears in the above-identified patent and that said Letters Patent is hereby corrected as shown below:

COLUMN 15
Line 8, "-5&068" should read -- -58.068--.

COLUMN 18
Line 40, "r9" should read --aspherical r9--;
Line 47, "aspherical r16" should read --r16--; and
Line 52, "d21=228" should read --d21=2.28--.

UNITED STATES PATENT AND TRADEMARK OFFICE
CERTIFICATE OF CORRECTION

PATENT NO. : 5,995,296

DATED : November 30, 1999

INVENTOR(S) : FUMIAKI USUI

It is certified that error appears in the above-identified patent and that said Letters Patent is hereby corrected as shown below:

<u>COLUMN 20</u>
Line 40, "r9" should read --aspherical r9--;
Line 42, "aspherical r11" should read --r11--;
Line 44, "r13" should read --aspherical r13--; and
Line 46, "aspherical r16" should read --r16--.

Signed and Sealed this

Twenty-sixth Day of December, 2000

Q. TODD DICKINSON

*Attest:*

*Attesting Officer*        *Director of Patents and Trademarks*